US012429213B2

(12) United States Patent
Bell et al.

(10) Patent No.: US 12,429,213 B2
(45) Date of Patent: Sep. 30, 2025

(54) POWER TOOL UTILIZING OPTICAL FIBERS TO OUTPUT LIGHT

(71) Applicant: MILWAUKEE ELECTRIC TOOL CORPORATION, Brookfield, WI (US)

(72) Inventors: Brandon S. Bell, Shorewood, WI (US); Zachary Jankowski, Oak Creek, WI (US); Riley G. F. Jones, Waukesha, WI (US); David M. Pittman, Sussex, WI (US); Torrin T. Santy, Menomonee Falls, WI (US); Ian C. Mckay, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/663,770

(22) Filed: May 14, 2024

(65) Prior Publication Data

US 2024/0384867 A1 Nov. 21, 2024

Related U.S. Application Data

(60) Provisional application No. 63/569,954, filed on Mar. 26, 2024, provisional application No. 63/466,839, filed on May 16, 2023, provisional application No. 63/466,840, filed on May 16, 2023.

(51) Int. Cl.
*F21V 33/00* (2006.01)
*B25F 5/02* (2006.01)
*F21V 8/00* (2006.01)

(52) U.S. Cl.
CPC ............ *F21V 33/0084* (2013.01); *B25F 5/02* (2013.01); *G02B 6/0006* (2013.01); *G02B 6/0008* (2013.01)

(58) Field of Classification Search
CPC ..... F21V 33/0084; B25F 5/02; G02B 6/0006; G02B 6/0008
See application file for complete search history.

(56) References Cited

U.S. PATENT DOCUMENTS

| 4,460,337 A | 7/1984 | Landgraf et al. |
| 4,519,780 A | 5/1985 | Strohmaier et al. |
| 5,038,481 A | 8/1991 | Smith |
| 5,198,702 A * | 3/1993 | McCullough ............. F16P 3/12 307/116 |

(Continued)

FOREIGN PATENT DOCUMENTS

| CN | 101112757 A | 1/2008 |
| CN | 201224092 Y | 4/2009 |

(Continued)

*Primary Examiner* — Lucas E. A. Palmer
(74) *Attorney, Agent, or Firm* — Michael Best & Friedrich LLP

(57) ABSTRACT

A power tool includes a primary housing, and a motor situated within the primary housing. The power tool also includes a circuit board located within the primary housing, and a light source mounted to the circuit board. The power tool also includes an optical fiber including a first end and a second end. The first end may be coupled to the light source and may be configured to receive light generated by the light source. The second end may be configured to emit the light to an outside of the primary housing to provide a status indication to a user and/or to illuminate a work area.

20 Claims, 27 Drawing Sheets

(56) References Cited

U.S. PATENT DOCUMENTS

| | | | |
|---|---|---|---|
| 5,525,842 A * | 6/1996 | Leininger | H02K 1/2713 |
| | | | 290/43 |
| 5,801,454 A | 9/1998 | Leininger | |
| 6,027,224 A * | 2/2000 | Schnell | B26B 11/008 |
| | | | 362/253 |
| RE36,917 E | 10/2000 | Leininger | |
| 6,694,631 B2 * | 2/2004 | Bone | G01C 9/10 |
| | | | 33/391 |
| 6,803,683 B2 | 10/2004 | Bone et al. | |
| 7,069,662 B2 * | 7/2006 | Fung | B25H 1/0085 |
| | | | 33/366.24 |
| 7,152,329 B2 | 12/2006 | Kondo et al. | |
| 7,256,520 B2 | 8/2007 | Braun et al. | |
| 7,534,165 B2 | 5/2009 | Milbourne et al. | |
| 7,677,752 B2 | 3/2010 | Tadokoro et al. | |
| 7,815,356 B2 | 10/2010 | Lutz et al. | |
| 7,850,325 B2 * | 12/2010 | Wall | B25F 5/021 |
| | | | 362/120 |
| 8,042,966 B2 | 10/2011 | Lutz et al. | |
| 8,317,350 B2 | 11/2012 | Friedman et al. | |
| 8,328,381 B2 | 12/2012 | Dixon et al. | |
| 8,382,308 B2 | 2/2013 | Hecht et al. | |
| 8,496,366 B2 | 7/2013 | Leong | |
| 8,506,108 B2 | 8/2013 | Friedman et al. | |
| 8,714,765 B2 | 5/2014 | Miyazawa | |
| 8,820,955 B2 | 9/2014 | Dixon et al. | |
| 8,827,483 B2 | 9/2014 | Dixon et al. | |
| 8,841,871 B2 | 9/2014 | Yang et al. | |
| 8,857,534 B2 * | 10/2014 | Braun | B23Q 17/24 |
| | | | 173/171 |
| 9,028,088 B2 | 5/2015 | Vanko et al. | |
| 9,114,512 B2 | 8/2015 | Beer et al. | |
| 9,242,355 B2 | 1/2016 | Sergyeyenko et al. | |
| 9,328,915 B2 | 5/2016 | Vanko et al. | |
| 9,352,458 B2 | 5/2016 | Friedman et al. | |
| 9,481,081 B2 | 11/2016 | Hecht et al. | |
| 9,539,691 B2 | 1/2017 | Hirschburger | |
| 9,644,837 B2 | 5/2017 | Vanko et al. | |
| 10,040,181 B2 | 8/2018 | Fu et al. | |
| 10,058,989 B2 | 8/2018 | Chellew | |
| 10,173,307 B2 | 1/2019 | Sergyeyenko et al. | |
| 10,174,934 B2 | 1/2019 | Padget et al. | |
| 10,525,582 B2 | 1/2020 | Qiu et al. | |
| 10,543,588 B2 | 1/2020 | Vanko et al. | |
| 10,821,595 B2 | 11/2020 | Qiu et al. | |
| 10,864,619 B2 | 12/2020 | Sergyeyenko et al. | |
| 10,981,292 B2 | 4/2021 | Schlecker et al. | |
| 11,090,786 B2 | 8/2021 | Puzio | |
| 11,213,937 B1 | 1/2022 | Rajzer et al. | |
| 11,280,488 B2 * | 3/2022 | Niwa | F21V 13/045 |
| 11,453,106 B2 * | 9/2022 | Kelly | B25F 5/021 |
| 11,480,330 B2 | 10/2022 | Ishikawa | |
| 11,491,633 B2 | 11/2022 | Cerfeuillet | |
| 2006/0113930 A1 * | 6/2006 | Andriolo | H02P 27/02 |
| | | | 318/66 |
| 2008/0074865 A1 * | 3/2008 | Lutz | B25B 23/18 |
| | | | 362/119 |
| 2011/0058356 A1 | 3/2011 | Friedman et al. | |
| 2011/0170312 A1 * | 7/2011 | Parrinello | F21V 33/0084 |
| | | | 362/577 |
| 2011/0307201 A1 * | 12/2011 | Yang | G01R 31/3646 |
| | | | 324/435 |
| 2013/0021783 A1 * | 1/2013 | Vanko | B25B 21/00 |
| | | | 362/119 |
| 2016/0325424 A1 * | 11/2016 | Bevins, Jr. | B23D 59/001 |
| 2016/0354889 A1 * | 12/2016 | Ely | B23Q 17/2404 |
| 2017/0151657 A1 * | 6/2017 | Nagasaka | H01H 13/08 |
| 2018/0126538 A1 * | 5/2018 | Qiu | G02B 6/0021 |
| 2018/0147686 A1 | 5/2018 | Valentini | |
| 2018/0217799 A1 * | 8/2018 | Tatehata | G05B 19/0423 |
| 2020/0281688 A1 * | 9/2020 | Lares | A61B 1/24 |
| 2021/0362282 A1 * | 11/2021 | Herr | B25B 23/1475 |
| 2021/0404647 A1 | 12/2021 | Ishikawa | |
| 2022/0009064 A1 * | 1/2022 | Puzio | F21S 9/04 |
| 2022/0088755 A1 | 3/2022 | Rajzer et al. | |
| 2022/0111506 A1 * | 4/2022 | Herr | B25F 5/02 |
| 2022/0133318 A1 | 5/2022 | Hudson et al. | |
| 2022/0297281 A1 | 9/2022 | Valentini | |
| 2022/0347829 A1 | 11/2022 | Holly et al. | |
| 2022/0388134 A1 | 12/2022 | Hozumi | |
| 2022/0388141 A1 | 12/2022 | Xu et al. | |
| 2023/0139855 A1 * | 5/2023 | Priddy | C02F 1/001 |
| | | | 210/251 |
| 2023/0362173 A1 * | 11/2023 | Dalton | H04W 12/121 |
| 2024/0058939 A1 * | 2/2024 | Stalfors | B25F 5/00 |
| 2024/0151390 A1 * | 5/2024 | Chikaraishi | B25F 5/00 |
| 2024/0329326 A1 * | 10/2024 | Oberlin | G02B 6/3636 |
| 2024/0347286 A1 * | 10/2024 | Abbott | H02J 7/0063 |
| 2024/0351175 A1 * | 10/2024 | Friedman | H01R 39/64 |
| 2025/0062664 A1 * | 2/2025 | Van Treeck | H02K 7/116 |

FOREIGN PATENT DOCUMENTS

| | | |
|---|---|---|
| CN | 101722506 A | 6/2010 |
| CN | 203792296 U | 8/2014 |
| CN | 104889943 A | 9/2015 |
| CN | 207155481 U | 3/2018 |
| CN | 210937287 U | 7/2020 |
| CN | 211674636 U | 10/2020 |
| CN | 211867693 U | 11/2020 |
| CN | 217065622 U | 7/2022 |
| CN | 218137688 U | 12/2022 |
| CN | 218283841 U | 1/2023 |
| DE | 2819691 A1 | 11/1979 |
| DE | 8424642 U1 | 1/1986 |
| DE | 3525352 A1 | 1/1987 |
| DE | 8520519 U1 | 11/1992 |
| DE | 4318980 A1 | 12/1994 |
| DE | 19640020 A1 | 4/1998 |
| DE | 19714466 A1 | 10/1998 |
| DE | 102008019278 A1 | 10/2009 |
| DE | 102008042848 A1 | 4/2010 |
| DE | 102012216600 A1 | 4/2014 |
| DE | 102012224448 A1 | 7/2014 |
| DE | 202015103986 U1 | 8/2015 |
| DE | 202015007928 U1 | 2/2016 |
| EP | 0504745 A1 | 9/1992 |
| EP | 3117964 A1 | 1/2017 |
| WO | 2008133317 A1 | 11/2008 |
| WO | 2015035732 A1 | 3/2015 |
| WO | 2016066294 A1 | 5/2016 |

\* cited by examiner

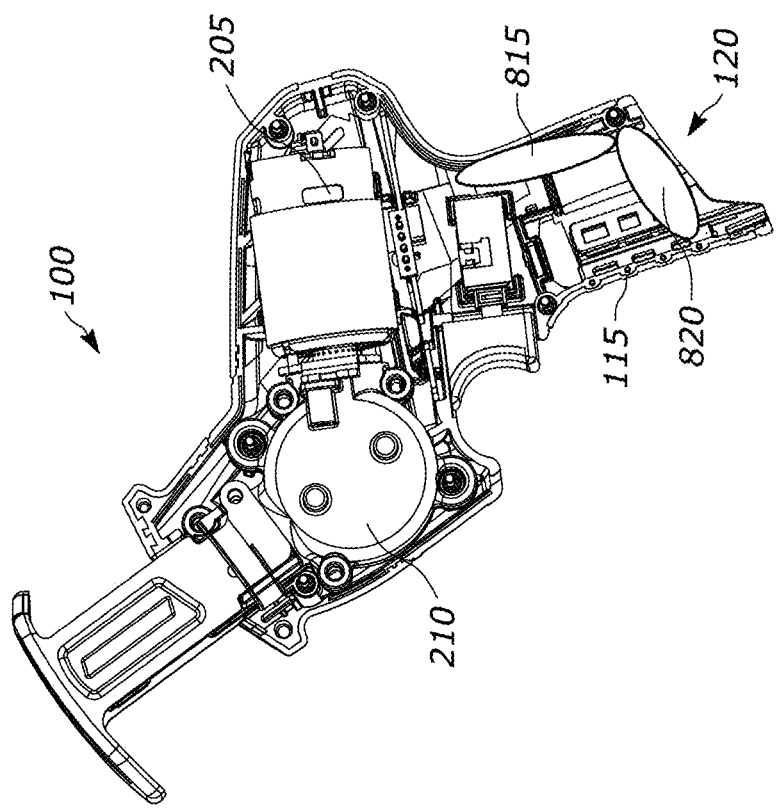

POWER TOOL UTILIZING OPTICAL FIBERS TO OUTPUT LIGHT

RELATED APPLICATIONS

This application claims priority to U.S. Provisional Application No. 63/569,954, filed on Mar. 26, 2024, to U.S. Provisional Application No. 63/466,840, filed on May 16, 2023, and to U.S. Provisional Application No. 63/466,839, filed on May 16, 2023, the entire contents of each of which are hereby incorporated by reference.

FIELD OF THE INVENTION

Some disclosed embodiments relate to a handheld power tool that includes a lighting assembly. Specifically, some disclosed embodiments relate to a power tool that includes an indicator lighting assembly that makes use of one or more optical fibers to provide light from one or more light sources within the power tool to an exterior of the power tool to the indicator lighting assembly (e.g., a status indicator such as a battery indicator). Some disclosed embodiments additionally or alternatively relate to a power tool that includes a work light assembly that makes use of one or more optical fibers to provide light from a light source within the power tool to an exterior of the power tool to light/illuminate a work area.

SUMMARY

Power tools (e.g., handheld power tools) may include one or more indicators (e.g., indicator lights) to inform a user of a status of the power tool (e.g., a status of the power tool, of the battery pack coupled to the power tool, or of both the power tool and the battery pack). For example, the status of the power tool may include a charge level of the battery pack coupled to the power tool.

Some battery packs may not include any indicators to communicate the battery charge to the user. Accordingly, some power tools may include an indicator located on a side of the power tool and configured to determine and subsequently display a status of the battery pack. Even when a battery pack includes its own indicators, the power tool may include indicators used to provide information about the battery pack and/or the power tool. For example, a reciprocating saw may include one or more light-emitting diodes (LEDs) positioned within a housing of the power tool such that the LEDs are visible on an external surface of the housing of the power tool.

However, LEDs located on or near the external surface of the housing of a power tool often require additional circuitry (e.g., one or more printed circuit boards (PCBs) and/or electrical components located on the PCBs) and/or wiring to allow the LEDs to function to illuminate. Accordingly, providing light output at or near the external surface of the housing for the purpose of functioning as a status indicator in a manner that eliminates the need for the additional circuitry and wiring typically associated with such light output would be beneficial. For example, eliminating the additional circuitry and/or wiring may save space within the power tool housing, which is limited, and may reduce manufacturing/assembly complexities and cost.

Turning to a related but different technological problem involving lighting for power tools, power tools (e.g., handheld power tools) may include one or more work lights configured to illuminate a working area of the power tool. For example, a power tool may include a single work light positioned near an output device of the power tool to illuminate a work area, for example, a work piece in which a hole is being drilled, a work piece in which a fastener is being secured, or the like.

Some power tools may include a work light located on a front surface of the power tool and configured to illuminate a work area of the power tool. For example, a high-torque impact wrench may include one or more light-emitting diodes (LEDs) positioned near an output device that is configured to transfer rotational energy from the high-torque impact wrench to a fastener. While the high-torque impact wrench is being operated by a user, the LEDs may illuminate the fastener and the work area so that the user can more easily see the fastener.

However, LEDs located near the output device often require additional circuitry (e.g., one or more PCBs and/or electrical components located on the PCBs) and/or wiring to allow the LEDs to function to illuminate the work area. Accordingly, providing light output near the output device to illuminate a work area in a manner that eliminates the need for the additional circuitry and wiring typically associated with such light output would be beneficial. For example, eliminating the additional circuitry and/or wiring may save space within the power tool housing, which is limited, and may reduce manufacturing/assembly complexities and cost.

One embodiment provides a power tool that may include a primary housing, and a motor situated within the primary housing. The power tool may also include a circuit board located within the primary housing, and a plurality of light sources mounted to the circuit board. The power tool may also include an electronic processor that may be configured to determine a status of the power tool, of a battery pack coupled to the power tool, or of both the power tool and the battery pack. The electronic processor also may be configured to control illumination of the plurality of light sources based on the status of the power tool, of the battery pack, or of both the power tool and the battery pack. The power tool may include a plurality of optical fibers each including a first end and a second end. The first end of each optical fiber may be coupled to a respective light source, and the second end of each optical fiber may be coupled to an indicator mount. The indicator mount may be coupled to the primary housing. The indicator mount may be configured to allow light from each light source of the plurality of light sources to be emitted, via a respective optical fiber, outside the primary housing to provide an indication of the status of the power tool, of the battery pack coupled to the power tool, or of both the power tool and the battery pack.

In addition to any combination of features described above, the plurality of light sources may emit the light into the first ends of the optical fibers in a first direction that is different from a second direction in which the light is emitted into the indicator mount and outside of the primary housing by the second ends of the optical fibers.

In addition to any combination of features described above, the indicator mount may be made of a transparent material and may include a plurality of protrusions that protrude into respective openings the primary housing toward an outside of the primary housing. Each protrusion may be configured to emit the light from a respective optical fiber.

In addition to any combination of features described above, the second ends of the optical fibers may be coupled to the indicator mount using a coupler that includes a respective insertion opening for each of the second ends of each optical fiber.

In addition to any combination of features described above, the second end of each optical fiber may be coupled to the coupler by being adhered within the respective insertion opening.

In addition to any combination of features described above, the first ends of the optical fiber may be coupled to the plurality of light sources using a connector mounted to the circuit board. The connector may be configured to provide light from each light source to its respective optical fiber and may be configured to prevent light from being provided from each light source to other optical fibers besides its respective optical fiber.

In addition to any combination of features described above, the electronic processor may be located on the circuit board.

In addition to any combination of features described above, the status of the power tool, of the battery pack coupled to the power tool, or of both the power tool and the battery pack may include at least one of a group consisting of a state of charge of the battery pack, temperature information about the battery pack, the power tool, or both the battery pack and the power tool, electrical current information about the battery pack, the power tool, or both the battery pack and the power tool, and combinations thereof.

In addition to any combination of features described above, the electronic processor may be configured to determine the status of the battery pack by communicating with the battery pack to receive the status of the battery pack.

In addition to any combination of features described above, the power tool may include a potting dam connector mounted to the circuit board to surround the plurality of light sources. The potting dam connector may be configured to prevent a potting compound from covering the plurality of light sources. The potting compound may be used for potting the circuit board. The potting dam connector may be configured to receive a second connector. The first ends of the optical fibers may be coupled to the plurality of light sources using the second connector and by securing the second connector to the potting dam connector. Light may be provided from each light source to its respective optical fiber through the second connector. The second connector may prevent light from being provided from each light source to other optical fibers besides its respective optical fiber.

In addition to any combination of features described above, the second connector may include a tab configured to secure the second connector to the potting dam connector in response to the second connector being coupled to the potting dam connector.

In addition to any combination of features described above, the indicator mount may be made of an opaque material and may include a plurality of holes that are each aligned with a respective first opening of the indicator mount that aligns with a respective second opening of the primary housing. Each hole of the plurality of holes may receive a respective optical fiber to emit the light from the respective optical fiber through the respective first opening and the respective second opening to an outside of the primary housing.

In addition to any combination of features described above, the respective first opening, the respective second opening, or both the respective first opening and the respective second opening may include a conical opening that is wider at a first location away from the respective optical fiber along a main light emission axis than at a second location closer to the respective optical fiber along the main light emission axis.

In addition to any combination of features described above, the plurality of light sources may emit the light into the first ends of the optical fibers in a first direction that is parallel to a second direction in which the light is emitted into the indicator mount and outside of the primary housing by the second ends of the optical fibers.

Another embodiment provides a power tool that may include a primary housing, and a motor situated within the primary housing. The power tool may also include a transmission device configured to transmit rotational energy from the motor to an output device of the power tool. The power tool may also include a circuit board located within the primary housing, and a light source mounted to the circuit board. The power tool may also include a light diffuser through which light generated by the light source passes in order to illuminate a work area of the power tool. The power tool may also include an optical fiber including a first end and a second end. The first end may be coupled to the light source and the second end is coupled to the light diffuser. The optical fiber may be configured to receive the light from the light source and provide the light to illuminate the work area through the light diffuser.

In addition to any combination of features described above, the light diffuser may include a light diffuser ring that surrounds an output axis of the power tool.

In addition to any combination of features described above, the power tool may include a secondary housing configured to house the transmission device. The light diffuser may be integrally molded within a cover configured to cover at least a portion of a front surface of the secondary housing.

In addition to any combination of features described above, an outer portion of the cover may be configured to block light from being emitted from at least a portion of the light diffuser ring.

In addition to any combination of features described above, the light source may emit the light into the first end of the optical fiber in a first direction that is different from a second direction in which the light is emitted through the light diffuser by the second end of the optical fiber.

In addition to any combination of features described above, the first end of the optical fiber may be coupled to the light source using an optical fiber coupler configured to prevent the light from the light source from being emitted in other directions besides through the optical fiber.

In addition to any combination of features described above, the second end of the optical fiber may be coupled to the light diffuser by being adhered within a receiving structure provided on a rear side of the light diffuser.

In addition to any combination of features described above, the power tool may include one or more additional optical fibers configured to receive the light from the light source and provide the light to illuminate the work area through the light diffuser.

In addition to any combination of features described above, the light diffuser may include a frosted surface, a lensing geometry, or both the frosted surface and the lensing geometry to create approximately uniform light distribution from the light diffuser.

In addition to any combination of features described above, the frosted surface may include a coating on a surface of the light diffuser, a texturing on the surface of the light diffuser, or both the coating and the texturing on the surface of the light diffuser.

In addition to any combination of features described above, the power tool may include a potting dam connector mounted to the circuit board to surround the light source.

The potting dam connector may be configured to prevent a potting compound from covering the light source. The potting compound may be used for potting the circuit board. The potting dam connector may be configured to receive a second connector. The first end of the optical fiber may be coupled to the light source using the second connector and by securing the second connector to the potting dam connector. The light may be provided from the light source to the optical fiber through the second connector.

In addition to any combination of features described above, the second connector may include a tab configured to secure the second connector to the potting dam connector in response to the second connector being coupled to the potting dam connector.

In addition to any combination of features described above, the light diffuser may include a hole that receives the optical fiber to emit the light from the optical fiber through the hole and the light diffuser to an outside of the primary housing.

In addition to any combination of features described above, the hole may include a conical opening that is wider at a first location away from the optical fiber along a main light emission axis than at a second location closer to the optical fiber along the main light emission axis.

In addition to any combination of features described above, the light source may emit the light into the first end of the optical fiber in a first direction that is parallel to a second direction in which the light is emitted into the light diffuser and outside of the primary housing by the second end of the optical fiber.

Another embodiment provides a power tool that may include a primary housing, and a motor situated within the primary housing. The power tool may also include a circuit board located within the primary housing, and a light source mounted to the circuit board. The power tool may also include an optical fiber including a first end and a second end. The first end may be coupled to the light source and may be configured to receive light generated by the light source. The second end may be configured to emit the light to an outside of the primary housing. The power tool may also include a first connector, and a second connector. The first connector may be mounted to the circuit board to surround the light source. The first connector may be configured to receive the second connector. The first end of the optical fiber may be coupled to the light source using the second connector and by securing the second connector to the first connector. The light may be provided from the light source to the optical fiber through the second connector.

In addition to any combination of features described above, the power tool may include a light diffuser. The second end of the optical fiber may be coupled to the light diffuser. The light generated by the light source may pass through the light diffuser to illuminate a work area of the power tool.

In addition to any combination of features described above, the light generated by the light source may be emitted to the outside of the primary housing to provide an indication of a status of the power tool, a status of a battery pack coupled to the power tool, or the status of both the power tool and the battery pack.

In addition to any combination of features described above, the power tool may include an indicator mount. The second end of the optical fiber may be coupled to the indicator mount. The indicator mount may be coupled to the primary housing and configured to allow the light from the light source to be emitted to the outside of the primary housing.

In addition to any combination of features described above, the power tool may include one or more additional optical fibers and one or more additional light sources. Each optical fiber may be configured to receive light from a respective light source and emit the light to the outside of the primary housing.

In addition to any combination of features described above, the light source may emit the light into the first end of the optical fiber in a first direction that is different from a second direction in which the light is emitted to the outside of the power tool by the second end of the optical fiber.

In addition to any combination of features described above, the first connector may be configured to prevent a potting compound from covering the light source, wherein the potting compound is used for potting the circuit board.

Before any embodiments are explained in detail, it is to be understood that the embodiments are not limited in application to the details of the configurations and arrangements of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

BRIEF DESCRIPTION OF THE DRAWINGS

FIGS. 8A-8C illustrate example printed circuit board (PCB) locations that are locations at which a PCB may be located within the power tool of FIG. 1, according to some example embodiments.

DETAILED DESCRIPTION

Figure 1:
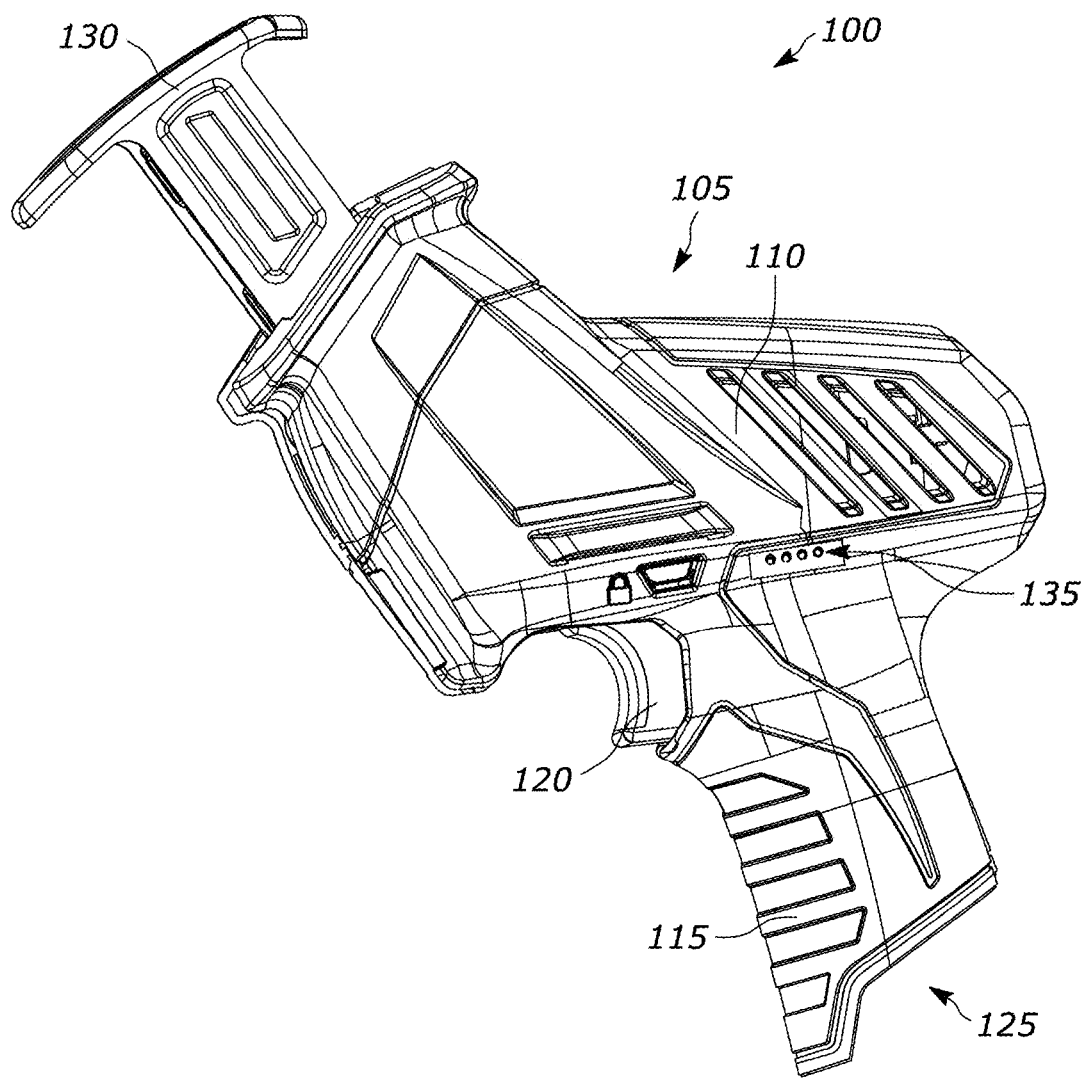
FIG. 1 illustrates a power tool, according to some example embodiments.
Figure 2:
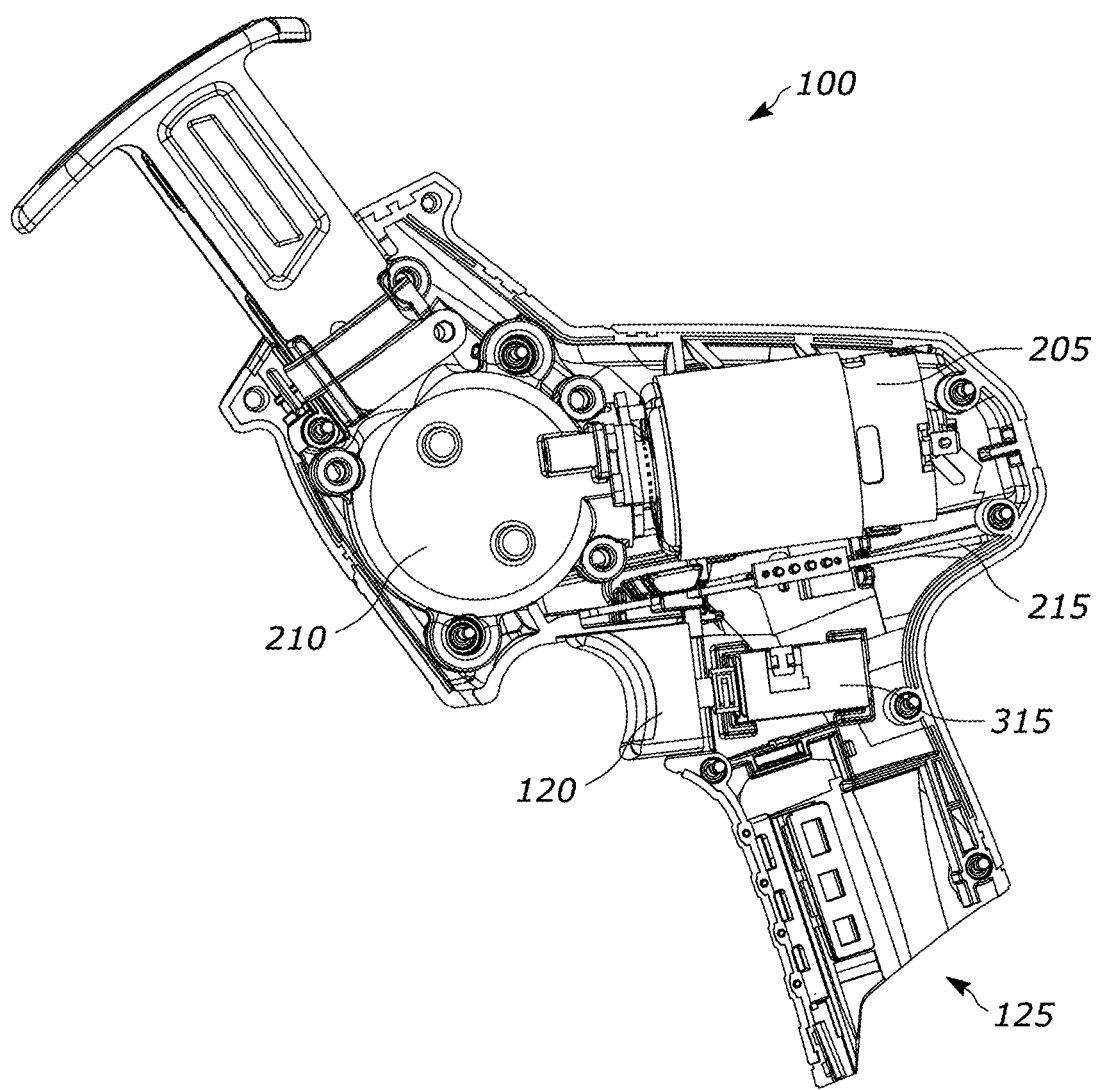
FIG. 2 illustrates a cross-sectional view of the power tool of FIG. 1, according to some example embodiments.

FIG. 1 illustrates a power tool 100 that includes an indicator lighting assembly/system according to one example embodiment. The power tool 100 includes a housing 105 (e.g., primary housing 105). The housing 105 may be configured to house a motor 205 as shown in FIG. 2 (e.g., a brushed motor, a brushless direct current (BLDC) motor, or the like). A portion of the housing 105 that is configured to house the motor 205 may be referred to as a motor housing 110 or main body 110 of the power tool 100. In some embodiments, the housing 105 is formed from two pieces of plastic configured to mate (e.g., a clamshell housing), such that an interior cavity is formed within the primary housing 105. A portion of the housing 105 may be formed into a handle 115 to allow a user to hold the power tool 100. A trigger 120 may be positioned on the handle 115 to allow a user to actuate the trigger 120 to variably control at least one parameter of the power tool 100. In some embodiments, the parameter may be an amount of power supplied to a motor 205 of the power tool 100. The housing 105 may further include a connection portion 125 (e.g., a battery pack interface 125) that may include an interface (not shown) configured to removably couple to a battery pack (not shown). The interface may include electrical contacts to allow power to be transferred from the battery pack to the power tool 100 (e.g., to provide power to the motor 205 and other components of the power tool 100). The power tool 100 also may include an output device 130 (e.g., a blade/bit/tool holder) on one end of the housing 105 to provide an output of the power tool 100 (see FIGS. 4 and 5A). For example, the output device 130 of the power tool 100 shown in FIG. 1 is configured to hold a blade and the output of the power tool 100 shown in FIG. 1 is a reciprocating output. However, the output device 130 may be configured to hold other types of tools, bits, etc. and/or may be configured to provide other types of output (e.g., a rotational output, an impacting output, and/or the like) for other types of power tools 100 (e.g., see FIG. 13 and its corresponding explanation).

In some embodiments, the output device 130 may include a fitting (e.g., a chuck, a collet, or the like) to removably couple an end tool (e.g., a saw blade, a tool bit, etc.) to the output device 130. In other embodiments, the output device 130 may be formed such that a fastener directly removably couples to the output device 130 to perform a loosening or tightening operation of the fastener. In some instances, the positioning of different portions of the power tool 100 (e.g., the motor housing 110, the handle 115, the output device 130, etc.) may be different than that shown in FIG. 1, for example, for different types of power tools 100.

The power tool 100 may further include indicators 135 (e.g., four indicators 135 in the example of FIG. 1) configured to emit light to indicate a status of the power tool 100 (including a status of the battery pack coupled to the power tool 100) as described in further detail below. In some embodiments, the indicators 135 are adjacent to the trigger 120 but located on a portion of the housing 105 above an area that is covered by a user's hand when gripping the handle 115 to allow the indicators 135 to be visible when the user's hand is gripping the handle 115. In other embodiments, the indicators 135 may be elsewhere on an external surface of the housing 105.

The particular power tool 100 illustrated and described herein (e.g., a reciprocating saw) is merely an example. The indicators 135 and/or associated optical fiber designs disclosed herein may also be implemented on other types of power tool devices including other power tools (e.g., the power tool 1300 of FIG. 13), battery packs, battery chargers, test and measurement equipment, vacuum cleaners, worksite radios, outdoor power equipment, non-motorized tools for task lighting applications, and vehicles. Power tools can include drills, circular saws, jig saws, band saws, reciprocating saws, screw drivers, angle grinders, straight grinders, hammers, multi-tools, impact wrenches, rotary hammers, impact drivers, angle drills, pipe cutters, grease guns, sanders, trim routers, and the like. Battery chargers can include wall chargers, multi-port chargers, travel chargers, and the like. Test and measurement equipment can include digital multimeters, clamp meters, fork meters, wall scanners, IR thermometers, laser distance meters, laser levels, remote displays, insulation testers, moisture meters, thermal imagers, inspection cameras, and the like. Vacuum cleaners can include stick vacuums, hand vacuums, upright vacuums, carpet cleaners, hard surface cleaners, canister vacuums, broom vacuums, and the like. Outdoor power equipment can include blowers, chain saws, edgers, hedge trimmers, lawn mowers, trimmers, and the like. Other non-motorized devices that may make use of the indicators 135 and/or the optical fiber designs may include electronic key boxes, calculators, cellular phones, headphones, cameras, motion sensing alarms, flashlights, worklights, weather information display devices, a portable power source, a digital camera, a digital music player, a radio, and multi-purpose cutters.

FIG. 2 illustrates a cross-sectional view of the power tool 100 according to one example embodiment. The power tool 100 includes a motor 205 configured to provide a rotational output to a transmission mechanism/device 210. The transmission mechanism/device 210 is configured to transfer the rotational output of the motor 205 to a reciprocating motion of the output device 130. The transmission mechanism 210 may be a gear transmission mechanism, an electronic transmission mechanism, an impacting transmission, a scotch-yoke mechanism, a combination of multiple types of transmission mechanism, or the like. In some instances, the transmission mechanism 210 may merely include a connection between a motor spindle and an output spindle (or a single motor/output spindle), for example, for tools that have direct drive operation. In some instances, at least a portion of the transmission mechanism 210 may be positioned within a separate secondary housing (not shown) such as a hammer case, for example, when the transmission mechanism 210 is an impacting transmission (e.g., see FIGS. 13-14).

As shown in FIG. 2, the power tool 100 may further include a printed circuit board (PCB) 215 located above the trigger 120 and below the motor 205. The PCB 215 may include one or more electronic components that may implement a control system of the power tool 100. In some embodiments, the power tool 100 may include more than one PCB 215 located in another portion of the housing 105 and/or the PCB 215 may be located in a different portion of the housing 105. In some embodiments, the PCB 215 includes an electronic processor 350 (see FIG. 3) configured to receive power from a power supply connected to the power tool 100 (e.g., a battery pack connected to the power tool 100 via the interface 125). The electronic processor 350 may be configured to control whether power is provided to one or more light sources 325, 330 (e.g., indicator lights to indicate a status of the power tool 100 and/or a work light to illuminate a work area) and/or the motor 205. The PCB 215 may include switching elements 345 (e.g., field-effect transistors 345) that are controlled by the electronic processor 350 to selectively provide power to coils of the motor 205 to allow operation thereof. In some embodiments, the PCB 215 may include additional or alternative components. For example, some or all of the components located on the PCB 215 may be located on one or more other PCBs within the power tool 100 and/or the PCB 215 may be located at other locations within the power tool 100 (e.g., see FIGS. 8A-8C).

Figure 3:
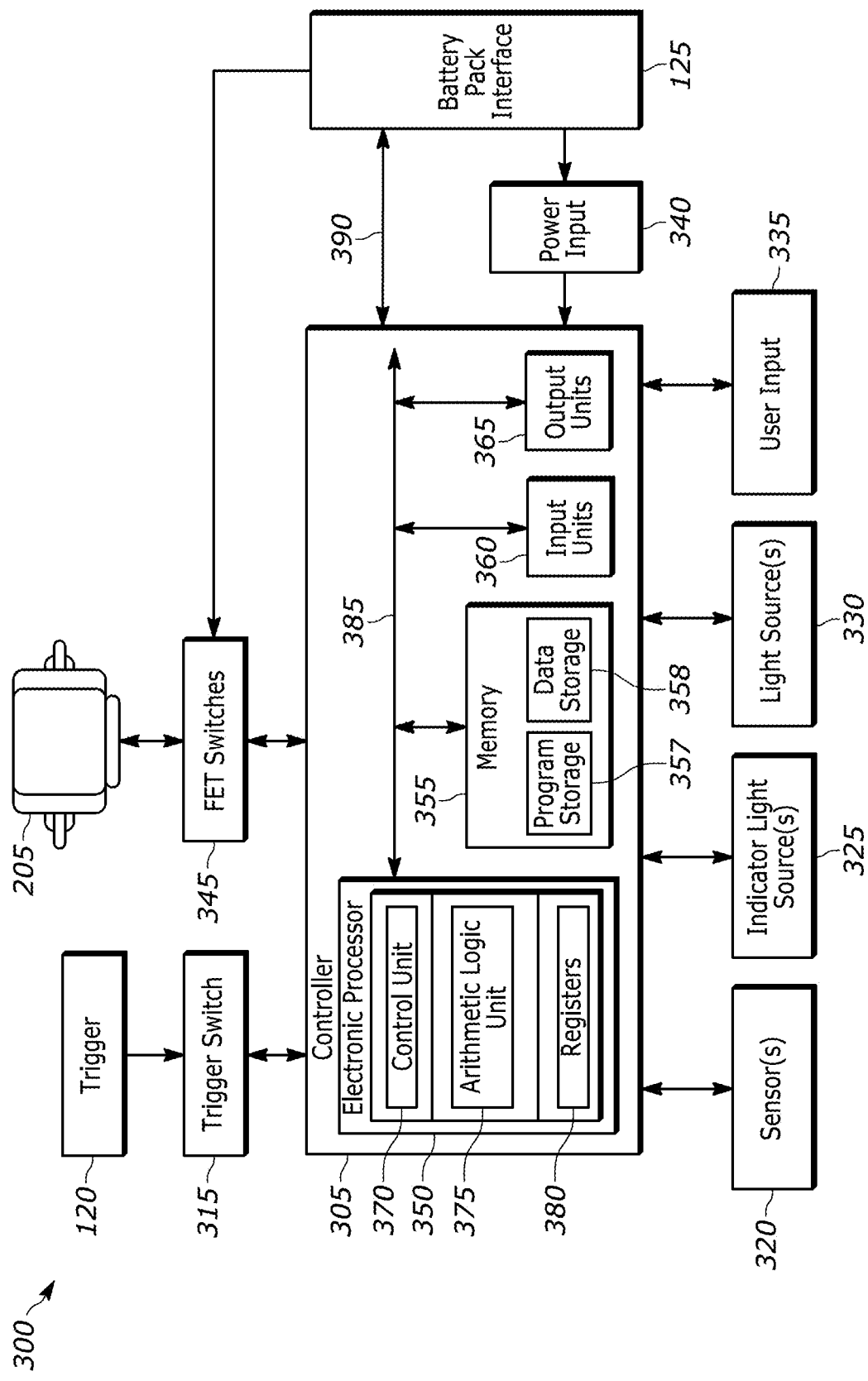
FIG. 3 illustrates a block diagram of the power tool of FIG. 1, according to some example embodiments.

FIG. 3 illustrates a block diagram 300 of the power tool 100 according to one example embodiment. The power tool 100 may include a controller 305. The controller 305 is electrically and/or communicatively connected to a variety of modules or components of the power tool 100. For example, as illustrated by FIG. 3, the controller 305 is electrically connected to the motor 205, a battery pack interface 125, a trigger switch 315 (connected to the trigger 120), one or more sensors or sensing circuits 320, one or more indicator light sources 325 (e.g., LEDs configured to be controlled to illuminate a status of the power tool 100), one or more other light sources 330 (e.g., configured to illuminate a work area), a user input 335 (e.g., switches, buttons, a mode pad, etc.), power input circuitry 340, and switching elements 345 (e.g., FET switches 345). The controller 305 includes combinations of hardware and software that are operable to, among other things, control the operation of the power tool 100, monitor the operation of the power tool 100, activate the one or more indicator light sources 325 and/or light sources 330, etc.

The controller 305 includes a plurality of electrical and electronic components that provide power, operational control, and protection to the components and modules within the controller 305 and/or the power tool 100. For example, the controller 305 includes, among other things, an electronic processor 350 (e.g., a microprocessor, a microcontroller, or another suitable programmable device), a memory 355, input units 360, and output units 365. The electronic processor 350 includes, among other things, a control unit 370, an arithmetic logic unit (ALU) 375, and a plurality of registers 380 (shown as a group of registers in FIG. 3), and is implemented using a computer architecture (e.g., a modified Harvard architecture, a von Neumann architecture, etc.). The electronic processor 350, the memory 355, the input units 360, and the output units 365, as well as the various modules or circuits connected to the controller 305 are connected by one or more control and/or data buses (e.g., common bus 385). The control and/or data buses are shown generally in FIG. 3 for illustrative purposes. The use of one or more control and/or data buses for the interconnection between and communication among the various modules, circuits, and components would be understood by a person skilled in the art in view of the embodiments described herein.

The memory 355 is a non-transitory computer readable medium and includes, for example, a program storage area 357 and a data storage area 358. The program storage area 357 and the data storage area 358 can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The electronic processor 350 is connected to the memory 355 and executes software instructions that are capable of being stored in a RAM of the memory 355 (e.g., during execution), a ROM of the memory 355 (e.g., on a generally permanent basis), or another non-transitory computer readable medium such as another memory or a disc. Software included in the implementation of the power tool 100 can be stored in the memory 355 of the controller 305. The software includes, for example, firmware, one or more applications, program data, filters, rules, one or more program modules, and other executable instructions. The controller 305 is configured to retrieve from the memory 355 and execute, among other things, instructions related to the control processes and methods described herein. In other constructions, the controller 305 includes additional, fewer, or different components.

In some instances, the electronic processor 350 that performs the actions and/or methods described herein may include any one or a combination of electronic processors located within the controller 305 and/or within the power tool 100. Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed within the power tool 100.

The battery pack interface 125 includes a combination of mechanical components (e.g., rails, grooves, latches, etc.) and electrical components (e.g., one or more terminals) configured to and operable for interfacing (e.g., mechanically, electrically, and communicatively connecting) the power tool 100 with a battery pack. For example, power provided by the battery pack to the power tool 100 is provided through the battery pack interface 125 to the power input circuitry 340. The power input circuitry 340 includes combinations of active and passive components to regulate or control the power received from the battery pack prior to power being provided to the controller 305. The battery pack interface 125 may also supply power to the FET switches 345 that are configured to selectively provide power to the motor 205 in accordance with instructions from the controller 305. The battery pack interface 125 also includes, for example, a communication line 390 configured to allow for communication between the controller 305 and the battery pack.

The indicator light sources 325 include, for example, one or more light-emitting diodes ("LEDs"). The indicator light sources 325 are configured to be controlled by the controller 305 to display conditions of, or information associated with, the power tool 100 and/or a battery pack coupled to the power tool 100 via the indicators 135. For example, the indicator light sources 325 and the associated indicators 135 may be configured to indicate measured electrical characteristics of the power tool 100 and/or the status of the power tool 100 (which may include status information of the power tool 100, of the battery pack coupled to the power tool 100, or of both the power tool and the battery pack). Some specific examples of status information that may be indicated by the indicators 135 includes at least one of a group consisting of a state of charge of the battery pack; temperature information about the battery pack, the power tool, or both the battery pack and the power tool; electrical current information about the battery pack, the power tool, or both the battery pack and the power tool; and combinations thereof. In some instances, the controller 305 (e.g., the electronic processor 350) of the power tool 100 may be configured to determine the status of the battery pack (e.g., a charge level) coupled to the power tool 100 by communicating with the battery pack to receive the status of the battery pack. The electronic processor 350 may subsequently control the illumination of the indicator light sources 325 such that the indicators 135 emit light based on the status of the battery pack.

The user input 335 is operably coupled to the controller 305 to, for example, select a forward mode of operation or a reverse mode of operation, a torque and/or speed setting for the power tool 100 (e.g., using torque and/or speed switches or a mode pad), etc. In some embodiments, the user input 335 includes a combination of digital and analog input or output devices required to achieve a desired level of operation for the power tool 100, such as one or more knobs, one or more dials, one or more switches, one or more buttons, a mode pad, etc.

In some embodiments, the controller 305 (specifically, the electronic processor 350) is configured to control whether power is provided to the indicator light sources 325 that provide light to the indicators 135. In some embodiments, the controller 305 may receive power from a power supply of the power tool 100 and provide power to the indicator light sources 325 directly. In such embodiments, the controller 305 may condition received power as appropriate before providing power to the indicator light sources 325, for example, via traces on the PCB 215 to which the indicator light sources 325 may be mounted (see FIG. 5B). In other embodiments, the indicator light sources 325 may be electrically connected to the power supply (e.g., to the battery pack via the battery pack interface 125 and one or more wires that connect the battery pack interface 125 to the PCB 215 to which the indicator light sources 325 are mounted) with a switch between each of the indicator light sources 325 and the power supply. In such embodiments, the controller 305 may control the switch to allow or disallow power from be provided to each of the indicator light sources 325. In such embodiments, the electrical path from the power supply to the indicator light sources 325 may include conditioning circuitry similar to the power input circuitry 340 to regulate or control the power received by the indicator light sources 325 from the power supply.

The controller 305 may be configured to monitor tool conditions using the sensors 320. For example, the controller 305 may be configured to determine whether a fault condition of the power tool 100 is present and generate one or more control signals related to the fault condition. In some embodiments, the sensors 320 include one or more current sensors, one or more speed sensors, one or more Hall Effect sensors, one or more temperature sensors, etc. The controller 305 calculates or includes, within memory 355, predetermined operational threshold values and limits for operation of the power tool 100. For example, when a potential thermal failure (e.g., of a FET 345, the motor 205, etc.) is detected or predicted by the controller 305, power to the motor 205 can be limited or interrupted until the potential for thermal failure is reduced. If the controller 305 detects one or more such fault conditions of the power tool 100 or determines that a fault condition of the power tool 100 no longer exists, the controller 305 is configured to provide information and/or control signals to another component of the power tool 100 (e.g. the battery pack interface 125, the indicator light sources 325, etc.).

In some embodiments, the controller 305 is configured to control the indicator light sources 325 to control an output of the indicators 135 to indicate information to a user about a tool condition of the power tool 100 (e.g., by illuminating different indicator light sources 325, by controlling one or more indicator light sources 325 to flash, etc.). In some embodiments, the controller 305 is configured to control the indicator light sources 325 to indicate a status of the power tool 100 as described previously herein. For example, all of the indicators 135 may be illuminated upon determining that the battery pack coupled to the power tool 100 is fully charged. As another example, less than all of the indicators 135 may be illuminated upon determining that the battery pack is less than fully charged (e.g., below a predetermined charge threshold). As yet another example, one or more of the indicators 135 may be illuminated and/or flash in response to the controller 305 determining that a fault has occurred in the power tool 100.

FIGS. 4-6B illustrate different partially exploded and/or zoomed-in views of the power tool 100. As shown in FIGS. 4-6B, light may be provided from the indicator light sources 325 (see FIG. 5B) to respective indicators 135 of an indicator mount 610 (see FIG. 6B) via respective optical fibers 405. Accordingly, the optical fibers 405 and the indicator mount 610 provide an illumination pathway for light to travel from the indicator light sources 325 to the exterior of the power tool 100 to indicate a status of the power tool 100. The optical fiber 405 may be made of any suitable material (e.g., plastic, glass, polymer composites, glass-polymer composites etc.) to effectively direct the light output from the indicator light sources 325 to the indicators 135. For example, the optical fibers 405 may be made of a flexible polymer, allowing the optical fibers 405 to navigate curves or corners within the power tool housing 105. Accordingly, the plurality of indicator light sources 325 may each emit light into one end of a respective optical fiber 405 for the light to be emitted by a respective indicator 135 at an external surface of the power tool 100 (e.g., light emitted to an outside of the housing 105). The power tool 100 may include a single indicator light source 325 coupled (e.g., optically and/or physically coupled) to a single optical fiber 405 or may include a plurality of indicator light sources 325 each coupled (e.g., optically and/or physically coupled) to a respective optical fiber 405 of a plurality of optical fibers 405. For example, while most of the embodiments described herein include a plurality of indicator light sources 325 and a plurality of optical fibers 405 that are each coupled (e.g., optically and/or physically coupled) to a respective indicator light source 325, in some instances, the power tool 100 may include a single indicator light source 325 and a single optical fiber 405 coupled (e.g., optically and/or physically coupled) to the single indicator light source 325. In some embodiments, the optical fiber 405 may include a plurality of strands, and each strand may be coupled (e.g., optically and/or physically coupled) to a respective indicator light source 325. In some embodiments, each optical fiber 405 may be part of a fiber optic cable that may include multiple optical fiber strands, a jacket (e.g., a plastic jacket around one or more optical fibers), and/or insulation material.

Figure 4:
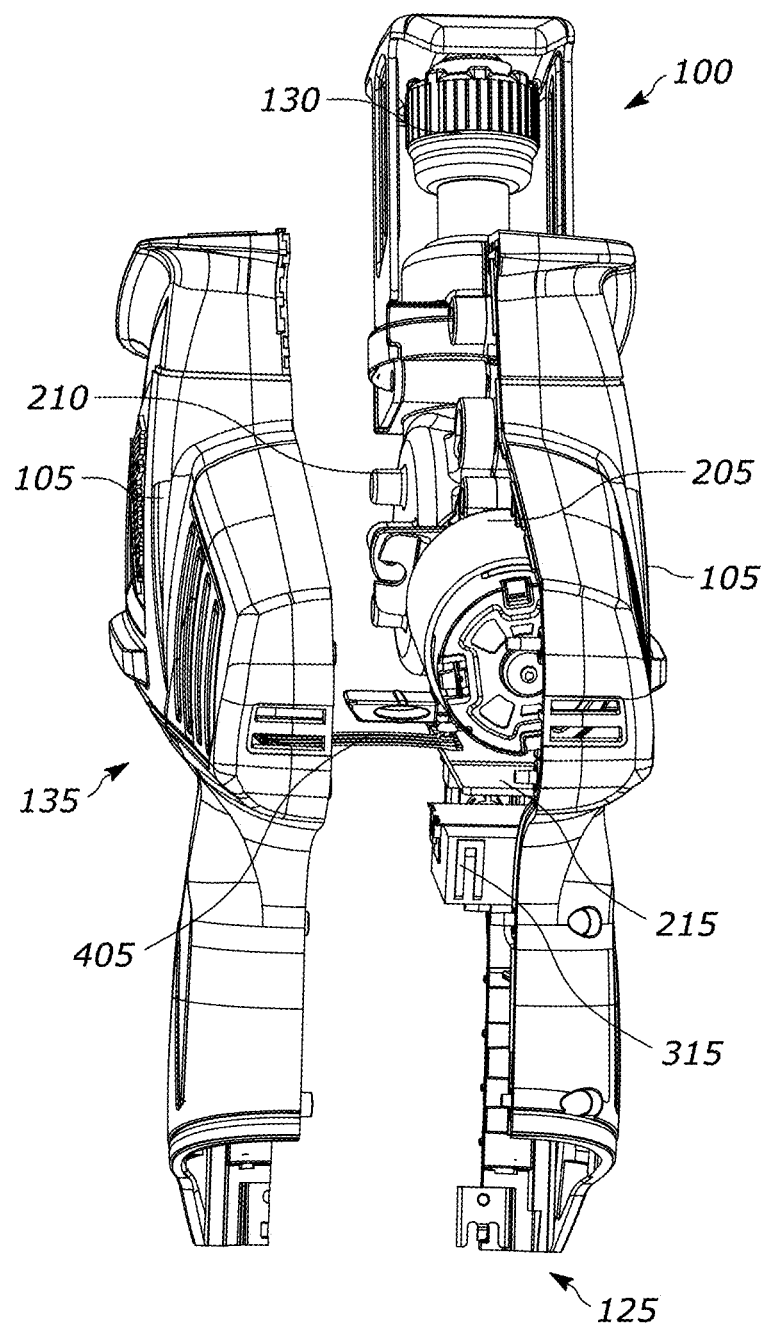
FIG. 4 illustrates a partially exploded view of the power tool of FIG. 1, according to some example embodiments.
Figures 5A, 5B:
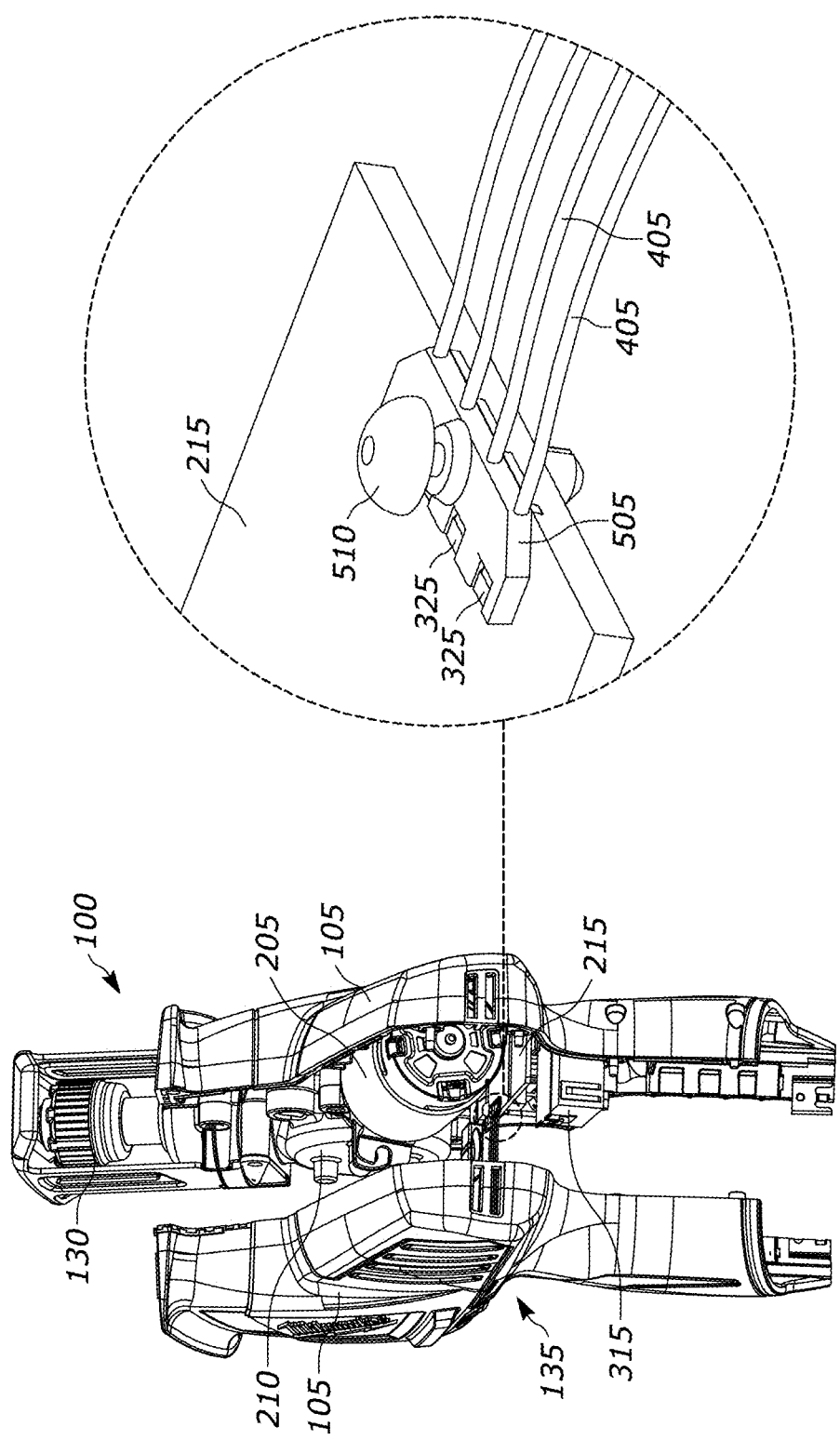
FIGS. 5A and 5B respectively illustrate another partially exploded view of the power tool of FIG. 1 and a detail view of a portion of a circuit board located within the power tool of FIG. 1, according to some example embodiments.

FIGS. 5A and 5B illustrate a perspective view of the exploded view shown in FIG. 4 and a detailed view of first ends of the optical fibers 405. With reference to FIGS. 5A and 5B, the indicator light sources 325 are shown mounted on a top surface of the PCB 215. Each light source 325 may be connected to a respective optical fiber 405 using a respective portion of connector 505 (e.g., a light collecting connector 505). The connector 505 may be mounted to the PCB 215 at a location adjacent to or on the light sources 325. The connector 505 may be mounted to the circuit board 215 using a circuit board mount 510 such as a snap-rivet as shown in FIG. 5B. In some instances, the connector 505 includes protrusions that are configured to protrude into slots on the PCB 215 to further secure the connector 505 in place on the PCB 215. For example, the protrusions may be downward protrusions located underneath an area where each of the optical fibers 405 is connected to the connector 505. The connector 505 may be configured to provide light from each light source 325 to its respective optical fiber 405 and prevent light from being provided from each light source 325 to other optical fibers 405 besides its respective optical fiber 405. In other words, in some instances, the connector 505 is configured to isolate the output of each light source 325 to its respective optical fiber 405. The connector 505 may be made of any suitable material (e.g., rubber, an opaque/light blocking material, transparent or semi-transparent material, etc.). In some instances, the connector 505 may be a light blocking connector 505. In some embodiments, a first end of each optical fiber 405 may be coupled to the connector 505 by being inserted and/or adhered into the connector 505 to receive light from a respective light source 325. In some embodiments, the optical fibers 405 may be friction fit into the connector 505.

Figures 6A, 6B:
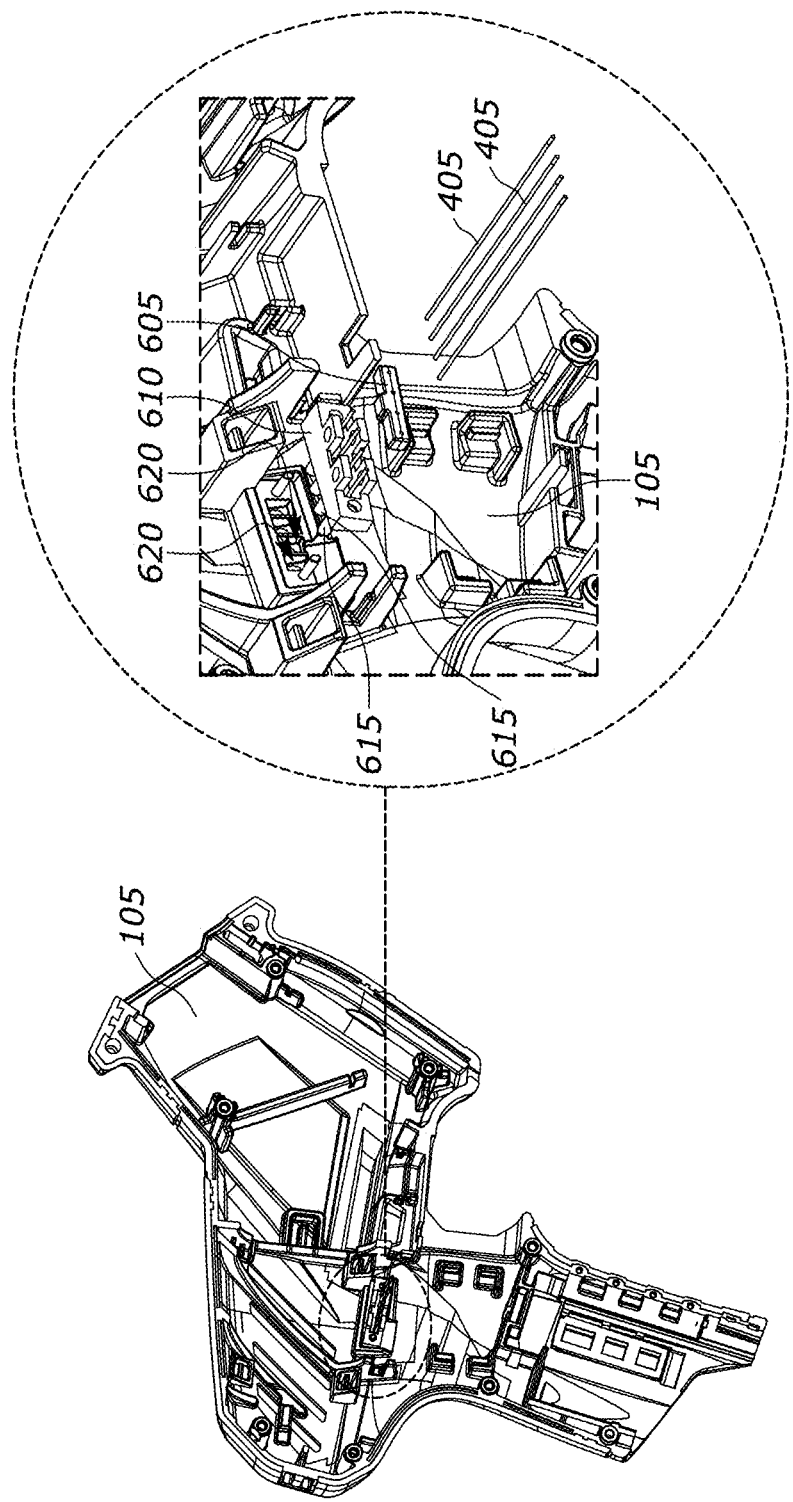
FIGS. 6A and 6B respectively illustrate a perspective view of a portion of a housing of the power tool of FIG. 1 and a detail view of an indicator mount located on the housing, according to some example embodiments.

FIGS. 6A and 6B illustrate a side view of a housing half 105 and a detailed exploded view of the indicator mount 610 to which a second end of each respective optical fiber 405 is coupled to provide the indicators 135. The indicator mount 610 may include a coupler 605 (e.g., preferably an opaque/light blocking coupler, but a transparent/semi-transparent coupler may be used) mounted within an inside surface (e.g., within a chamber or indentation) of the indicator mount 610.

The coupler 605 may be coupled to the indicator mount 610 in any suitable manner (e.g., adhered with glue, friction fit, and/or the like). The coupler 605 may be configured to receive the second ends of the optical fiber 405 in respective insertion openings and isolate each respective optical fiber 405 from one another. The coupler 605 may be made of any suitable material (e.g., rubber, plastic, and/or the like) and may engage the optical fibers 405 in any suitable manner (e.g., adhered with glue, friction fit, and/or the like). The indicator mount 610 may be made of a transparent material and may include a plurality of protrusions 615 that protrude into respective openings 620 of the housing 105 toward an outside of the housing 105. Each protrusion 615 may be configured to emit the light from a respective optical fiber 405 to the exterior of the housing 105 to provide the indicators 135. In some embodiments, the protrusions 615 may include a frosted surface or lensing geometry to disperse light in a uniform manner and/or in a certain direction. As shown in FIG. 6B, the indicator mount 610 may include other protrusions and/or indents or holes to allow the indicator mount 610 to be mounted to corresponding indents or holes and/or protrusions on an inside surface of the housing 105.

Figure 7:
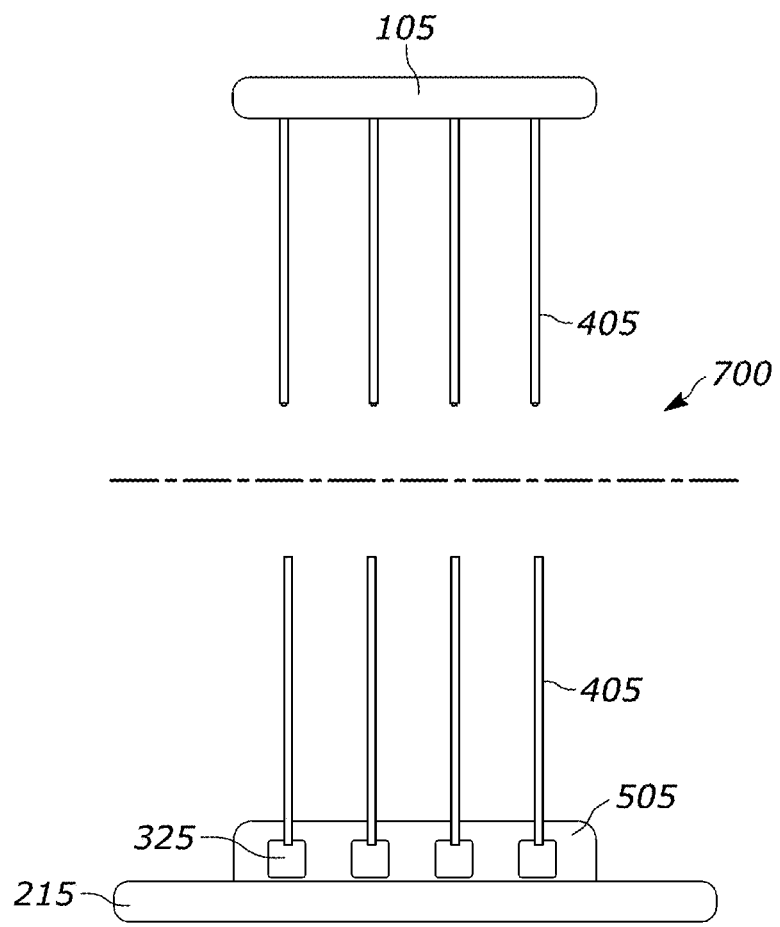
FIG. 7 illustrates a schematic diagram including components of an illumination pathway from light sources on the interior of the power tool of FIG. 1 to the indicator mount located on the housing of the power tool of FIG. 1, according to some example embodiments.

FIG. 7 illustrates a schematic diagram including components of an illumination pathway 700 from the light sources 325 on the PCB 215 to the indicators 135. As previously mentioned, the light sources 325 may be disposed on the PCB 215 and coupled to a first end of a respective optical fiber 405 via the connector 505. In some embodiments, the connector 505 may be flexible (e.g., made of rubber or a similar material). In some embodiments, the optical fiber 405 may be coupled to the PCB 215 or may be directly fastened to the light sources 325. For example, the optical fiber 405 may be directly adhered to the light source 325. The light source 325 may be adapted to illuminate at a reduced solid angle (e.g., adding a lens, modifying a LED housing, etc.). The light output from the light source 325 travels from the first end of the optical fiber 405 to a second end coupled to the indicator mount 610, where the optical fiber 405 outputs light outside the housing 105 to provide the indicators 135. In some embodiments, an output end of the optical fibers 405 may be polished to achieve a uniform light output.

As shown in FIGS. 4-6B, the light sources 325 emit the light into the first ends of the optical fiber 405 in a first direction that is parallel to a second direction in which the light is emitted into the indicator mount 610 and outside of the primary housing 105 by the second ends of the optical fiber 405. For example, the light sources 325 may emit light into the first ends of the optical fiber 405 in a first direction that is the same as the direction in which the light is emitted through the indicator mount 610 by the second ends of the optical fiber 405 to the outside of the housing 105 of the power tool 100. However, in other embodiments, the light sources 325 may emit light into the first ends of the optical fibers 405 in a first direction that is different from a second direction in which the light is emitted into the indicator mount 610 and outside of the housing 105 by the second ends of the optical fibers 405. Accordingly, in some instances, the indicator mount 610/indicators 135 may be located in other locations on the housing 105 and/or the light sources 325 may be located in other locations on the PCB 215 or on a different PCB within the housing 105.

Figure 8B:
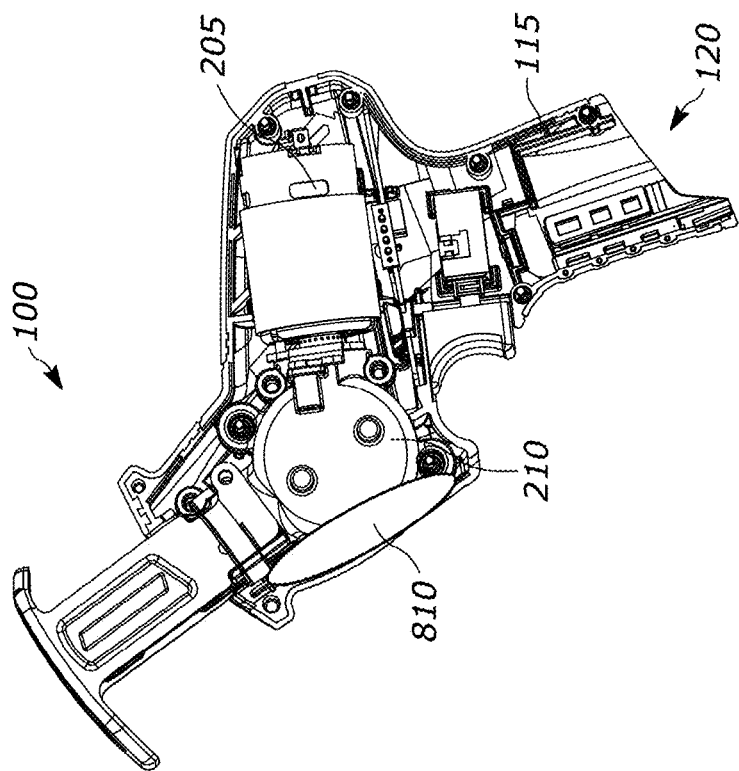
Figure 8A:
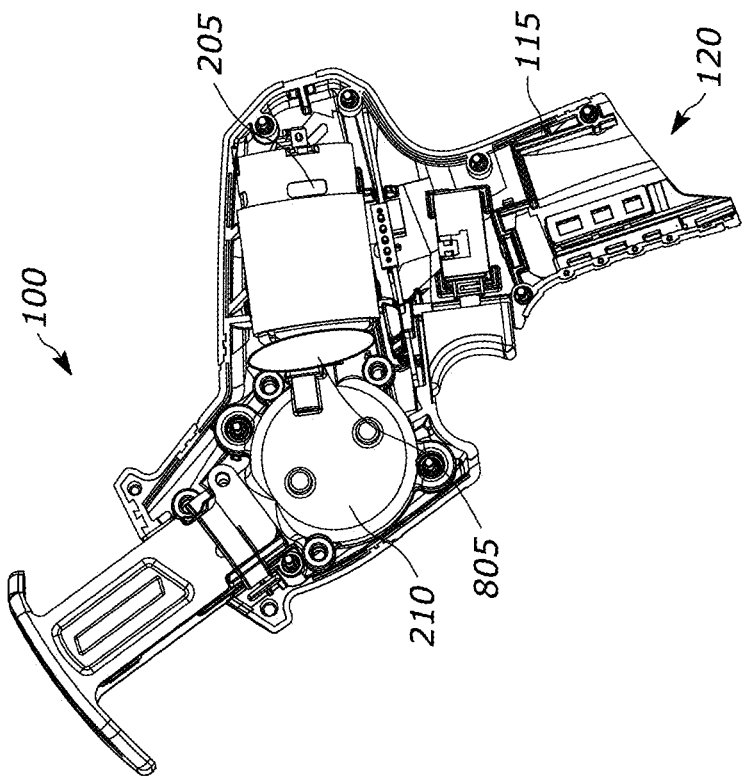

In some instances, the light sources 325 may be located at a different location on the PCB 215 than the example location shown in FIGS. 4-6B. For example, the light sources 325 may be mounted on a bottom surface of the PCB 215 and/or along a different edge of the PCB 215 that faces in a direction that is different than the direction in which light is emitted out of the indicator mount 610. Although the light sources 325 and corresponding connector 505 are shown and described as being located on the PCB 215, the light sources 325 may be located on other PCBs that are located at other locations within the power tool 100. FIGS. 8A, 8B, and 8C illustrate example board locations 805, 810, and 815, respectively, which are locations 805 at which a PCB (e.g., PCB 215, or another PCB) may be located within the power tool 100. For example, as shown in FIG. 8A, a PCB may be located between a front end of the motor 205 and a rear end of the transmission device 210. As another example, a PCB may be located in a similar orientation behind/rearward of the motor 205. As shown in FIG. 8B, a PCB may be located adjacent to/underneath the transmission device 210 at the location 810. As shown in FIG. 8C, a PCB may be located in the handle 115 of the power tool 100 at the location 815. As another example, a PCB may be located in a center of the handle 115 or at a forward side of the handle 115 as opposed to at a rear side of the handle 115 as shown in FIG. 8C. As yet another example, a PCB may be oriented differently (e.g., perpendicularly to the position 815 shown in FIG. 8C) at a location 820 at a bottom of the handle 115 as shown in FIG. 8C. The light sources 325 may be located (e.g., surface mounted) on either side of any PCB that is included within the power tool 100. Optical fiber(s) 405 may be used to route/guide light from the light source 325 to the indicator mount 610/indicators 135 that can also be located on any portion of the external surface of the housing 105.

In some instances, the PCB 215 (or another PCB) on which the light sources 325 are mounted may also include the controller 305, the electronic processor 350, the FETs 345, and/or other components of the power tool 100. In some instances, one or more of these components may be located on a PCB that is separate from the PCB on which the light sources 325 are mounted. In some instances, the optical fibers 405 may be located in other parts of the housing 105 and may be mounted on the PCB 215 or a different location other than the PCB 215 to provide an illumination pathway for light to travel from the light sources 325 to the indicator mount 610/indicators 135.

FIGS. 9A-12B illustrate another embodiment including components of the illumination pathway 700 from the light sources 325 on the PCB 215 to the indicators 135. With the exception of the differences explained below, the components of the embodiment disclosed in FIGS. 9A-12B are similar to those explained previously herein. In other words, previous descriptions of additional and/or alternate features and/or implementations also apply to the embodiment disclosed in FIGS. 9A-12B. Components of the embodiment disclosed in FIGS. 9A-12B may be similar to (e.g., may have the same or similar functionality as) like-named components described previously herein.

FIGS. 9A-12B illustrate an illumination assembly 900 that may be included in the power tool 100 according to some example embodiments. As shown in FIGS. 9A-12B, light may be provided from the indicator light sources 325 (see FIGS. 9C and 9D) to respective indicators 135 of the power tool 100 (see FIGS. 1, 4, and 5A) via respective optical fibers 405. Accordingly, the optical fibers 405 and the illumination assembly 900 provide an illumination pathway for light to travel from the indicator light sources 325 to the exterior of the power tool 100 to indicate a status of the power tool 100. Connection of the optical fibers 405 to the indicator light sources 325/PCB 215 and to an indicator mount 915 near the outside of a power tool housing 105 affects how well light is transmitted from the indicator light sources 325 through the optical fibers 405 outside of the power tool 100. Accordingly, it is beneficial to connect the optical fibers 405 to the indicator light sources 325/PCB 215 and to the indicator mount 915 in the example manner shown in FIGS. 9A-12B. Such a design allows for the optical fibers 405 to receive a vast majority of the light from the indicator light sources 325. Such a design also allows light output outside of the power tool 100 via the optical fibers 405 (e.g., through a clear/transparent lens) to be bright enough to be easily perceived by a user from multiple different viewing angles.

Figure 9A:
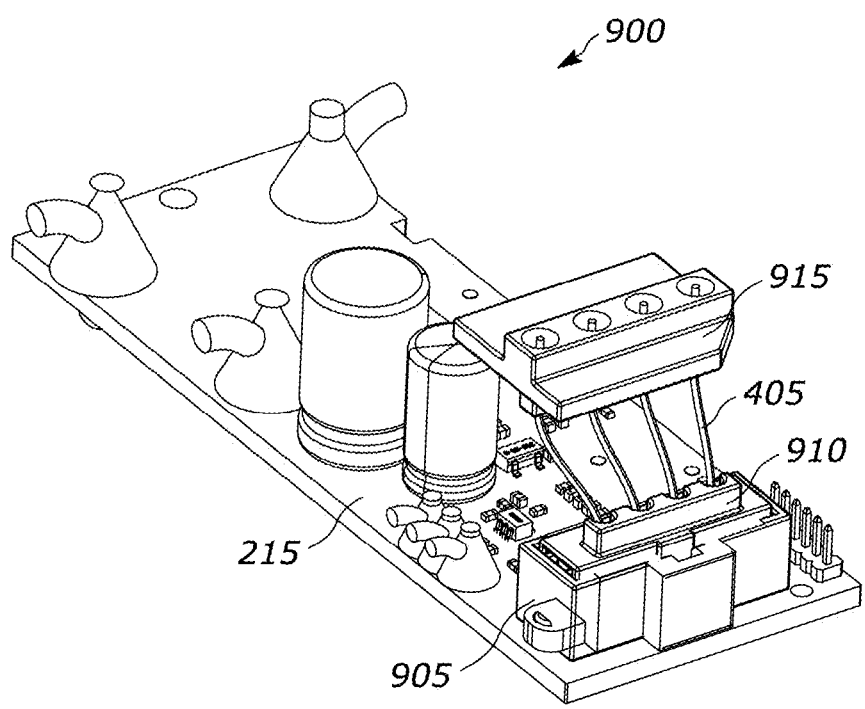
FIG. 9A illustrates a perspective view of a PCB and an illumination assembly according to some example embodiments.
Figure 9B:
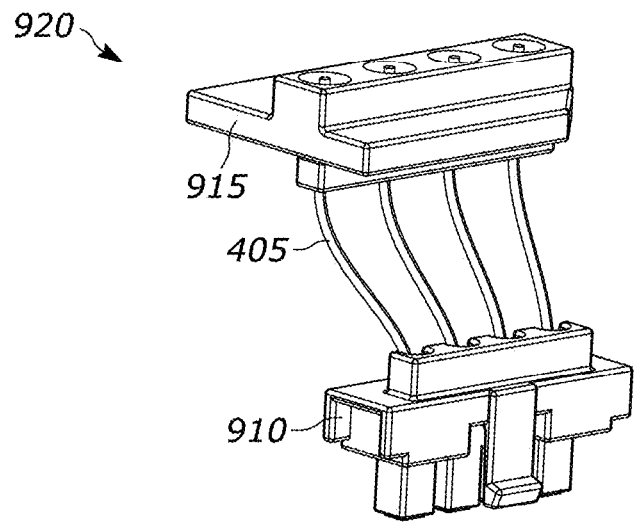
FIG. 9B illustrates a perspective view of an illumination assembly harness of the illumination assembly of FIG. 9A according to some example embodiments.
Figure 9C:
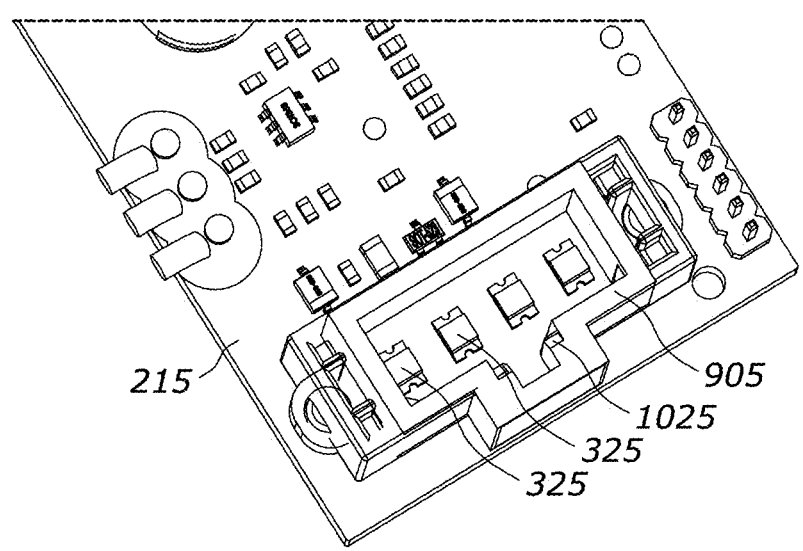
FIG. 9C illustrates a perspective view of the PCB of FIG. 9A and a potting dam connector with the illumination assembly harness of FIG. 9B removed according to some example embodiments.
Figure 9D:
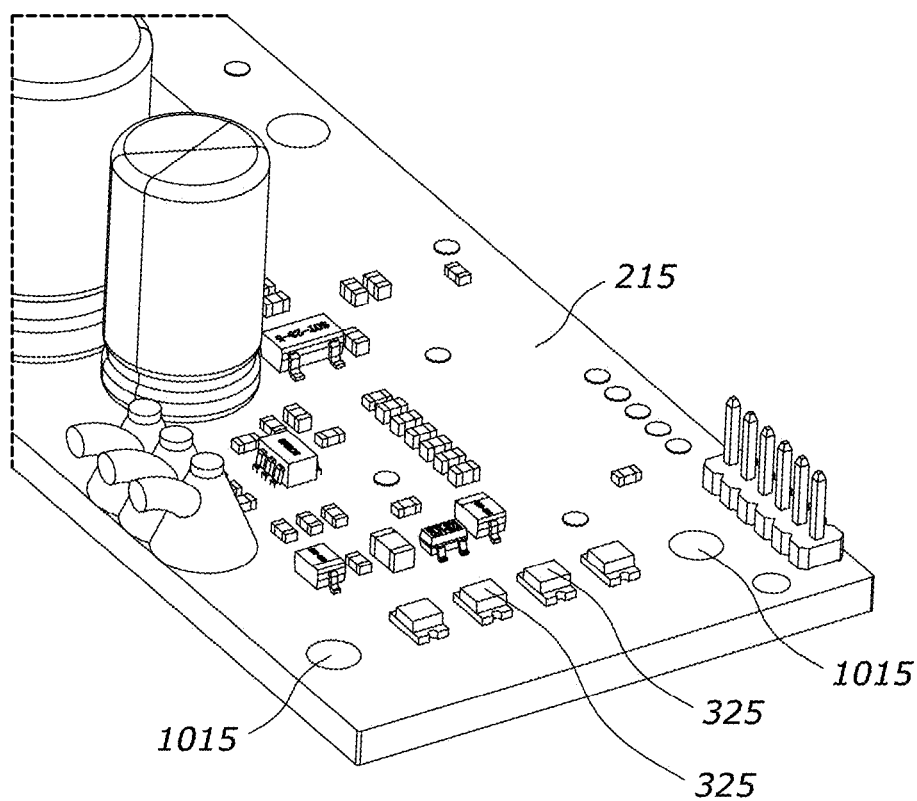
FIG. 9D illustrates the PCB of FIG. 9A with the potting dam connector of FIG. 9C removed according to some example embodiments.

FIG. 9A illustrates a perspective view of the PCB 215 and the illumination assembly 900 according to some example embodiments. The illumination assembly 900 may include a potting dam connector 905, a connector 910 (i.e., a second connector 910 that may be a light collecting connector 910), and an indicator mount 915. FIG. 9B illustrates a perspective view of an illumination assembly harness 920 that includes the connector 910, the indicator mount 915, and the optical fibers 405 extending between and coupling to each of the connector 910 and the indicator mount 915. FIG. 9C illustrates a perspective view of the PCB 215 and the potting dam connector 905 with the illumination assembly harness 920 removed (i.e., with the connector 910 removed from the potting dam connector 905). FIG. 9D illustrates the PCB 215 with the potting dam connector 905 removed (i.e., before the installation of the potting dam connector 905 on the PCB 215).

In some instances, the potting dam connector 905, the connector 910, and the indicator mount 915 may be made of the same or different materials than each other. Such materials may include plastic (e.g., plastic that is the same as or similar to the plastic of the housing 105), rubber, combinations thereof, and/or the like.

As shown in FIGS. 9C-9D, the potting dam connector 905 may be mounted on the same surface of the PCB 215 on which the indicator light sources 325 (e.g., LEDs) are mounted. The potting dam connector 905 may be installed on the surface of the PCB 215 so as to surround the indicator light sources 325 (e.g., create a surrounding perimeter on the sides of the area in which the indicator light sources 325 are mounted). In some instances, the potting dam connector 905 is configured to isolate the plurality of indicator light sources 325 from other components on the PCB 215. In some instances, the potting dam connector 905 is configured to prevent a potting compound from contacting and/or covering the plurality of indicator light sources 325. For example, a potting compound may be used for potting the PCB 215 within the housing 105 and/or within a potting boat that is located within the housing 105. However, if such potting compound contacts and/or covers one or more the indicator light sources 325, the light be emitted by the indicator light sources 325 may be at least partially blocked. To prevent the potting compound from blocking the light emitted by the indicator light sources 325, the potting dam connector 905 may be mounted on the PCB 215 around the light sources 325. Accordingly, a bottom of the potting dam connector 905 that contacts the PCB 215 may provide a seal between an outside of the potting dam connector 905 and an inside of the potting dam connector 905. For example, the bottom of the potting dam connector 905 may be sealed to the PCB 215 using glue, epoxy, another adhesive, and/or the like.

As shown in FIG. 9A, the potting dam connector 905 is configured to receive the connector 910. As shown in FIGS. 9A and 9B, first ends of each of the optical fibers 405 are coupled (e.g., optically coupled to create an illumination path) to the plurality of light sources 325 using the connector 910 and by securing the connector 910 to the potting dam connector 905. In some instances, the connector 910 is similar to the connector 505 described previously herein (e.g., the connector 910 may be made of an opaque material to be a light blocking connector or may be made of a transparent or semi-transparent material). In some instances, the connector 910 is configured to pass/provide light from each light source 325 to a respective optical fiber 405 and prevent light from being provided from each light source 325 to other optical fibers 405 besides its respective optical fiber 405. As shown in FIGS. 9A and 9B, second ends of each optical fiber 405 that are opposite the first ends of each optical fiber 405 are coupled to the indicator mount 915 to emit light outside of the power tool 100 as explained in greater detail below.

Figure 10A:
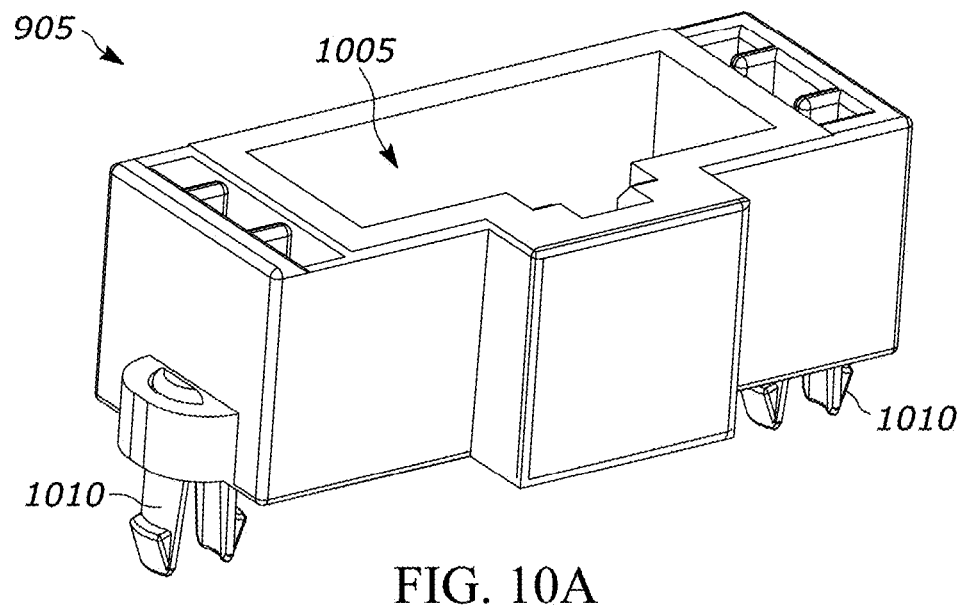
FIGS. 10A-10C illustrate perspective views of the potting dam connector of FIGS. 9A and 9C according to some example embodiments.
Figure 10B:
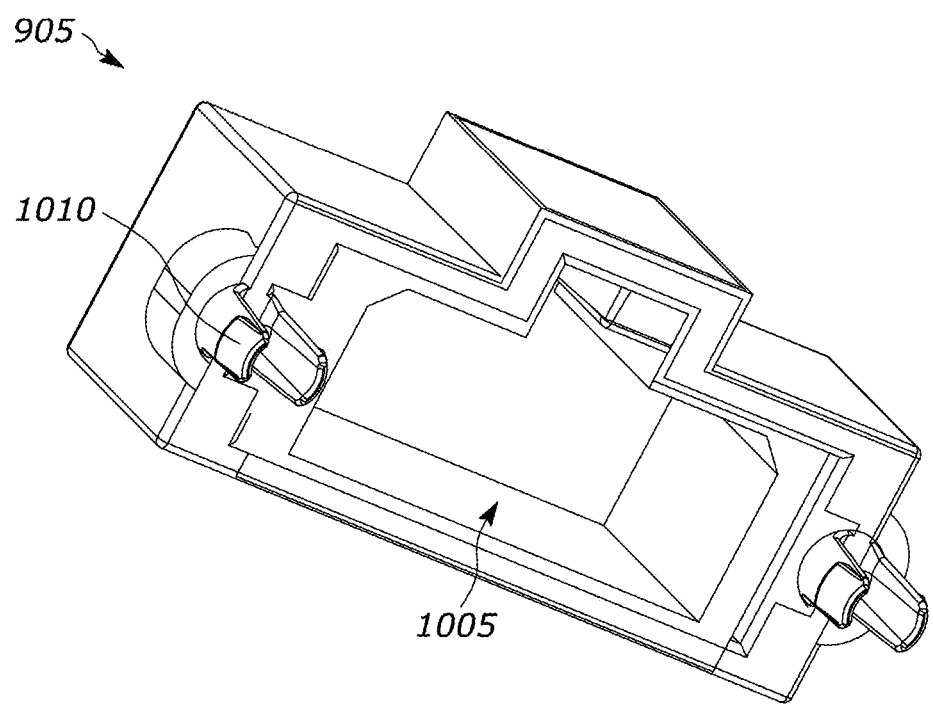
Figure 10C:
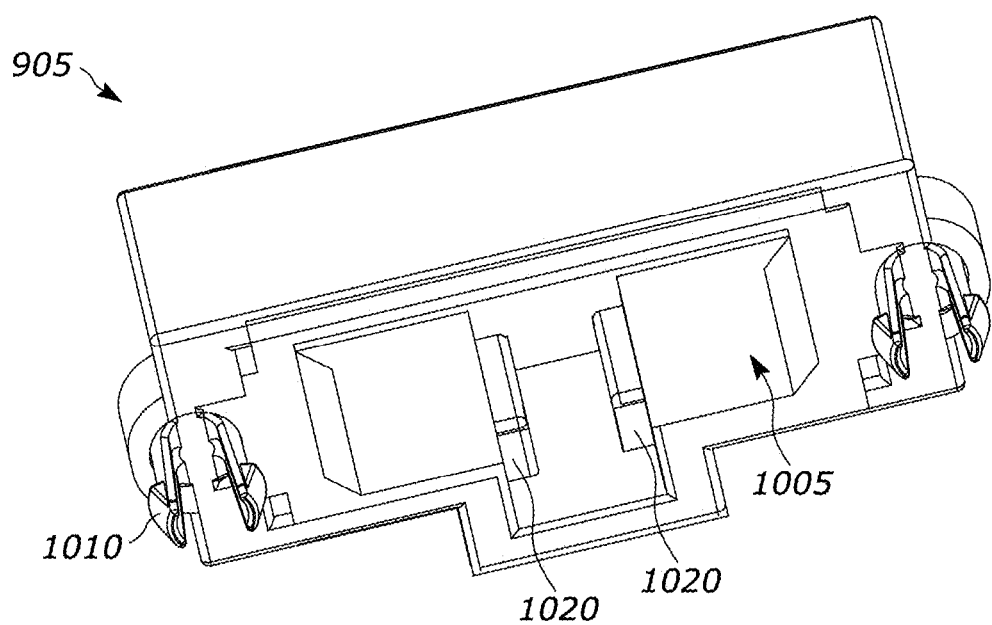
Figure 11A:
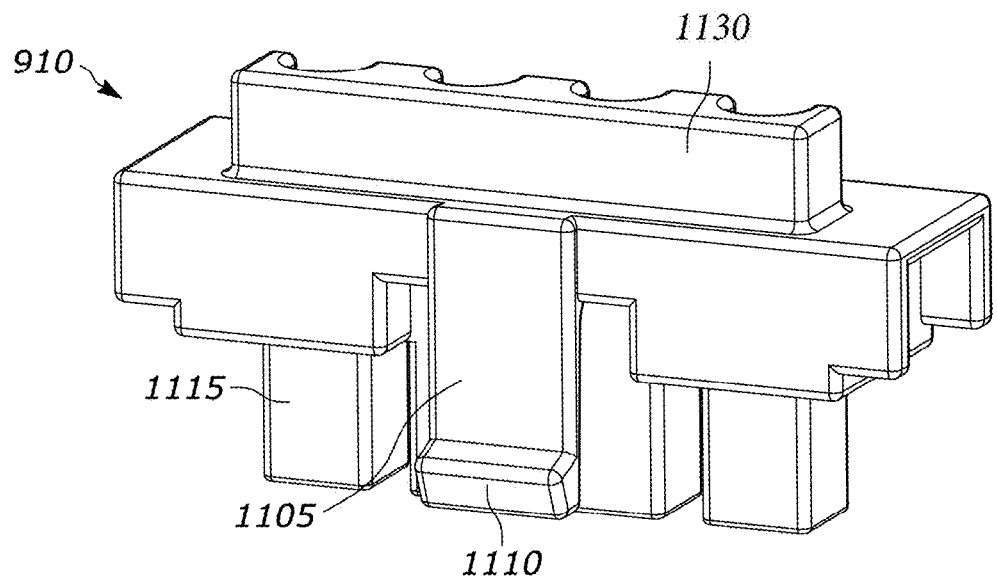
FIGS. 11A-11D illustrate perspective views of a connector of FIGS. 9A and 9B according to some example embodiments.
Figure 11B:
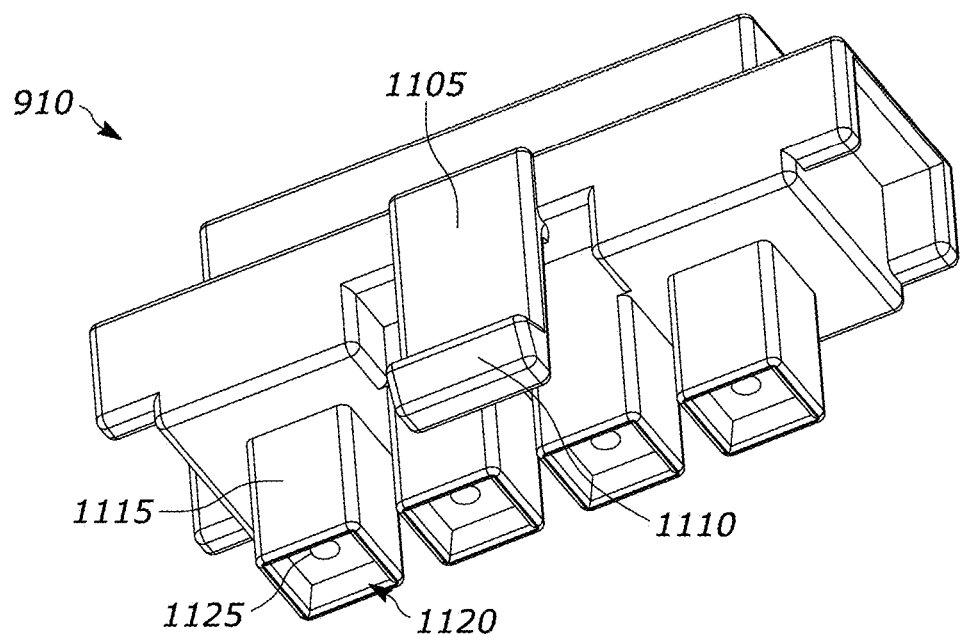
Figure 11C:
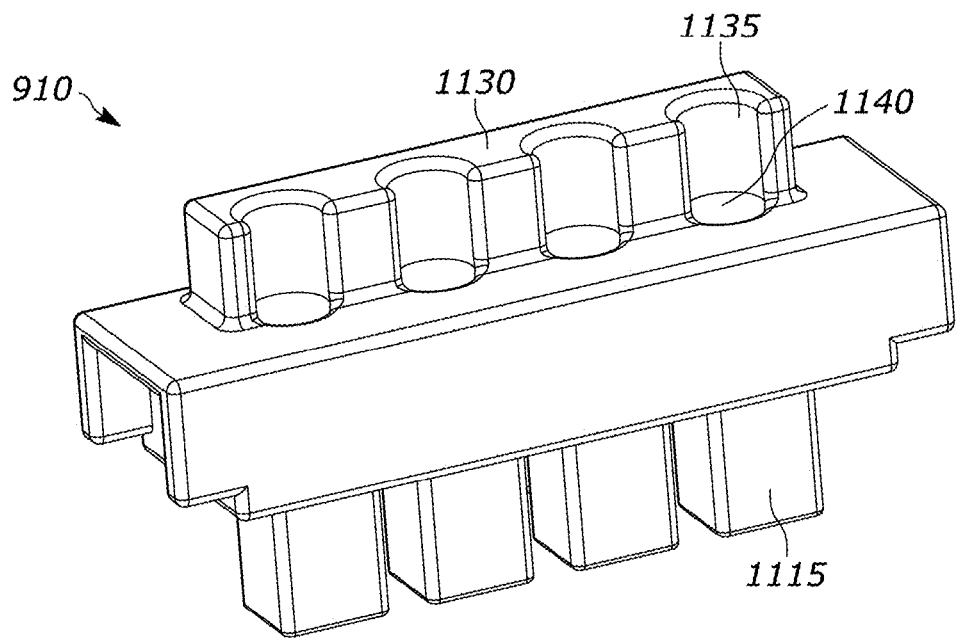
Figure 11D:
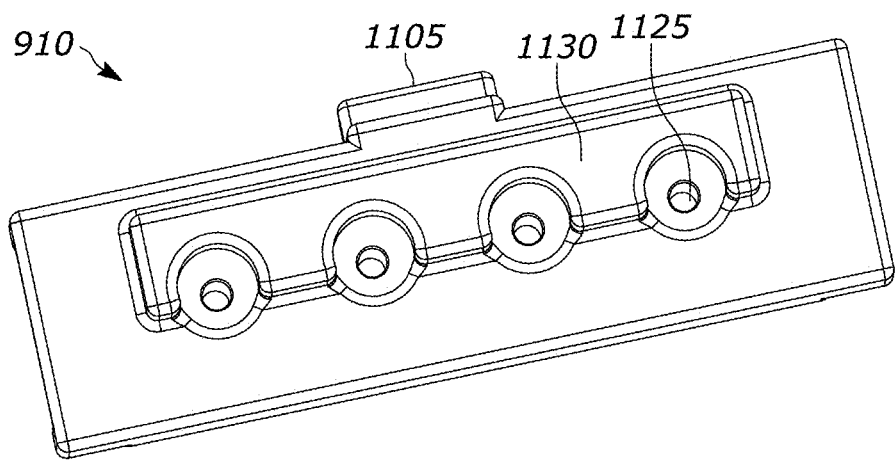

FIGS. 10A-10C illustrate perspective views of the potting dam connector 905 according to some example embodiments. In some instances, the potting dam connector 905 includes an opening/hole 1005 defined by side walls of the potting dam connector 905. As shown in FIG. 9C, this opening 1005 is where the light sources 325 are located when the potting dam connector 905 is mounted to the PCB 215. Additionally, the connector 910 is received in the opening 1005 of the potting dam connector 905 as shown in FIG. 9A. In some instances, the potting dam connector 905 includes tabs 1010 (e.g., snap-fit tabs) that are configured to be received in holes 1015 of the PCB 215 (see FIG. 9D) to secure the potting dam connector 905 to the PCB 215. For example, the tabs 1010 may be biased outwardly but may include an angled portion such that when the tabs 1010 are inserted into the hole 1015, the tabs 1010 are compressed inwards until the tabs 1010 emerge from the hole 1015 on the opposite side of the PCB 215. Upon emerging from the hole 1015, the tabs 1010 move back to their outwardly biased position to secure the potting dam connector 905 to the PCB 215. As indicated above, the potting dam connector 905 may be additionally or alternatively secured to the PCB 215 using adhesive. The potting dam connector 905 may additionally or alternatively be mounted to the PCB 215 in other manners (e.g., using fasteners such as screws, etc.). In some instances, the potting dam connector 905 may be secured to the PCB 215 using heat staking.

As shown in FIG. 10C, in some instances, the potting dam connector 905 includes one or more protrusions 1020 that protrude from an internal side surface of a side wall of the potting dam connector 905. The protrusion(s) 1020 may be used to secure the connector 910 to the potting dam connector 905 as explained in greater detail below.

FIGS. 11A-11D illustrate perspective views of the connector 910 according to some example embodiments. In some instances, the connector 910 includes a tab 1105 configured to secure the connector 910 to the potting dam connector 905 in response to the connector 910 being coupled to the potting dam connector 905. In some instances, the tab 1105 may be biased in a position as shown in FIGS. 11A-D but may be configured to flex inward toward the connector 910. For example, the tab 1105 may include an angled surface 1110 configured to engage with an angled surface 1025 (see FIG. 9C) on a top of the protrusion(s) 1020 of the potting dam connector 905 when the connector 910 is being coupled to the potting dam connector 905. The angled surfaces 1110, 1025 may interact with each other to cause the tab 1105 of the connector 910 to flex inwardly as the connector 910 is inserted into the opening 1005 of the potting dam connector 905. Upon reaching the end/bottom of the protrusion(s) 1020, the tab 1105 is biased back into its biased position to latch around the protrusion(s) 1020 and secure the lighting blocking connector 910 to the potting dam connector 905.

As shown in FIGS. 11A-11D, the connector 910 includes a plurality of lower protrusions/light channel portions 1115 that each cover a respective light source 325 (e.g., four light channel portions 1115 are shown since four light sources 325 are used in the example embodiment shown). Each light channel portion 1115 may include a concave opening 1120 at its bottom end so as to surround and cover a respective light source 325. The concave openings 1120 may prevent most light from each of the light sources 325 from escaping outside of the respective concave opening 1120. In some instances, a bottom end of light channel portions 1115 contacts the PCB 215 when the connector 910 is coupled to the potting dam connector 905. The connector 910 may snugly fit into the opening 1005 of the potting dam connector 905 to additionally aid in preventing light from the light sources 325 from being emitted anywhere except through the optical fibers 405. Each light channel portion 1115 may include a hole 1125 in which an optical fiber 405 may be inserted and/or through which light from the respective light source 325 may be transmitted to the optical fiber 405.

The connector 910 may also include an upper protrusion 1130 that includes a plurality of openings 1135 to allow for insertion of the optical fibers 405 into the holes 1125. In some instances, a lower portion of the openings 1135 may include a conical shape/portion 1140 that reduces in circumference from a circumference of the opening to a smaller circumference of the hole 1125 to allow for the optical fibers 405 to be easily inserted into respective holes 1125. In some instances, the circumference of each hole 1125 is approximately the circumference of the optical fiber 405 (or slightly larger) to allow an optical fiber 405 to be friction fit into to each hole 1125. Additionally or alternatively, adhesive (e.g., ultraviolet (UV) cured adhesive) may be applied to secure the optical fibers 405 into each hole 1125.

Figure 12A:
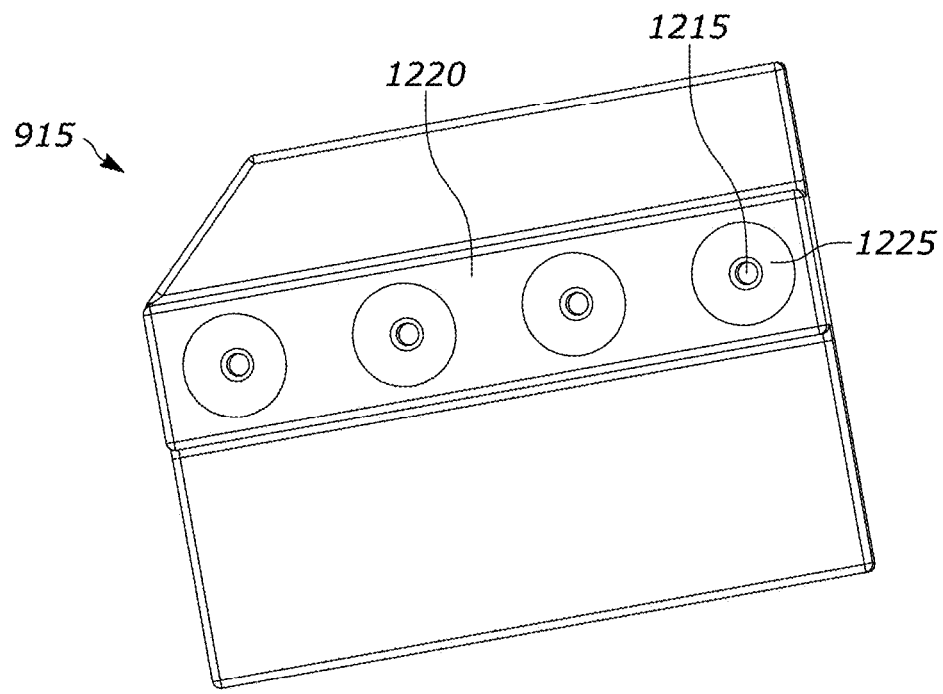
FIGS. 12A and 12B illustrate perspective views of an indicator mount of FIGS. 9A and 9B according to some example embodiments.
Figure 12B:
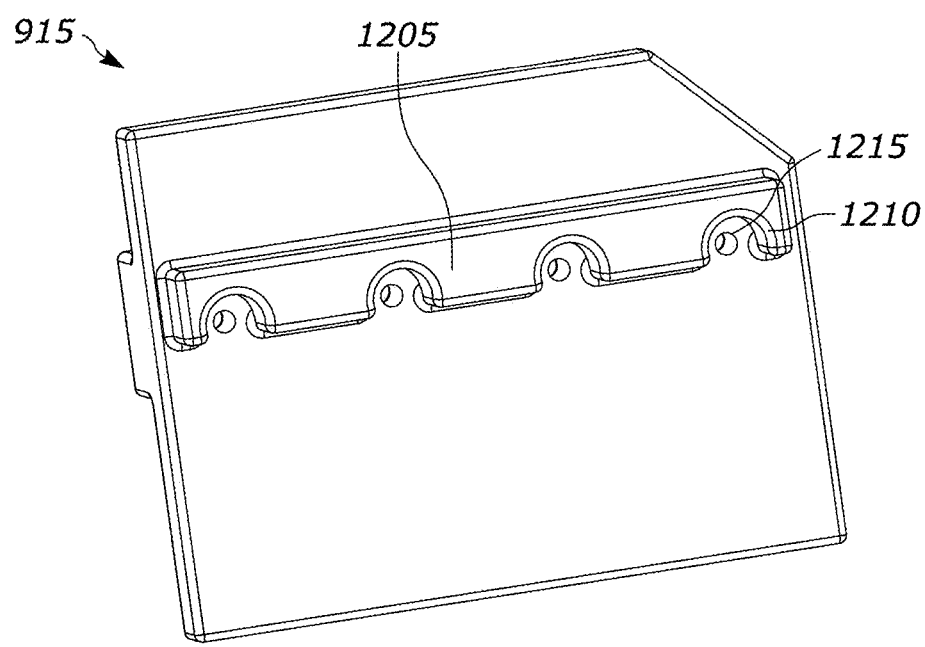

FIGS. 12A and 12B illustrate perspective views of the indicator mount 915 according to some example embodiments. In some instances, FIG. 12A illustrates a first side of the indicator mount 915 that faces outward toward an outside of the power tool 100. On the other hand, FIG. 12B illustrates a second side of the indicator mount 915 that is opposite to the first side and faces inward toward an interior of the housing 105 of the power tool 100. The indicator mount 915 may include an inner protrusion 1205 that protrudes from the second side of the indicator mount 915 inwardly toward an interior of the power tool 100. The inner protrusion 1205 may include a plurality of openings 1210 that each surround a respective hole 1215. The holes 1215 may be similar to the holes 1125 of the connector 910 explained previously herein. For example, the holes 1215 may be configured to receive (e.g., in a friction fit manner) the optical fibers 405.

The indicator mount 915 may also include an outer protrusion 1220. Each hole 1215 of the plurality of holes 1215 may each be aligned with a respective first opening 1225 of the outer protrusion 1220 on the indicator mount 915. Each of the first openings 1225 of the indicator mount 915 may align with a respective second opening of the primary housing 105 of the power tool 100. For example, light may be emitted from the respective optical fiber 405 through the respective first opening 1225 of the indicator mount 915 and through the respective second opening of the power tool housing 105 to an outside of the primary housing 105. In some instances, the first openings 1225, the second openings, or both the first openings and the second openings include a conical opening that is wider at a first location away from the respective optical fiber 405 along a main light emission axis than at a second location closer to the respective optical fiber 405 along the main light emission axis. For example, such a conical opening is shown as the first opening 1225 in FIG. 12A. In some instances, such a conical opening may provide more consistent/uniform light output that is more easily visible from multiple viewing angles. In some instances, the openings 1225 may be covered by individual transparent lenses or may be covered by a transparent lens strip that simultaneously covers multiple openings 1225.

As shown in FIGS. 9A-9D, the light sources 325 emit the light into the first ends of the optical fiber 405 in a first direction that is parallel to a second direction in which the light is emitted into the indicator mount 915 and outside of the primary housing 105 by the second ends of the optical fibers 405. For example, the light sources 325 may emit light into the first ends of the optical fiber 405 in a first direction that is the same as the direction in which the light is emitted through the indicator mount 915 by the second ends of the optical fiber 405 to the outside of the housing 105 of the power tool 100. However, in other embodiments, the light sources 325 may emit light into the first ends of the optical fibers 405 in a first direction that is different from a second direction in which the light is emitted into the indicator mount 915 and outside of the housing 105 by the second ends of the optical fibers 405. Accordingly, in some instances, the indicator mount 915/indicators 135 may be located in other locations and/or orientations on the housing 105 and/or the light sources 325 and the PCB 215 may be located in other locations and/or orientations within the housing 105. For example, if the illumination assembly 900 shown in FIGS. 9A-12B were implemented on the power tool 100 of FIG. 5A, the PCB 215 shown in FIG. 5A may be rotated 90 degrees such that light emitted by the light sources 325 is emitted in the same direction as the light is output outside of the housing 105. Alternatively, the PCB 215 may remain in the orientation shown in FIG. 5A but the optical fibers 405 may be bent at approximately a 90-degree angle to direct light from the upward facing light sources 325 through a side wall of the power tool housing 105.

Figure 13:
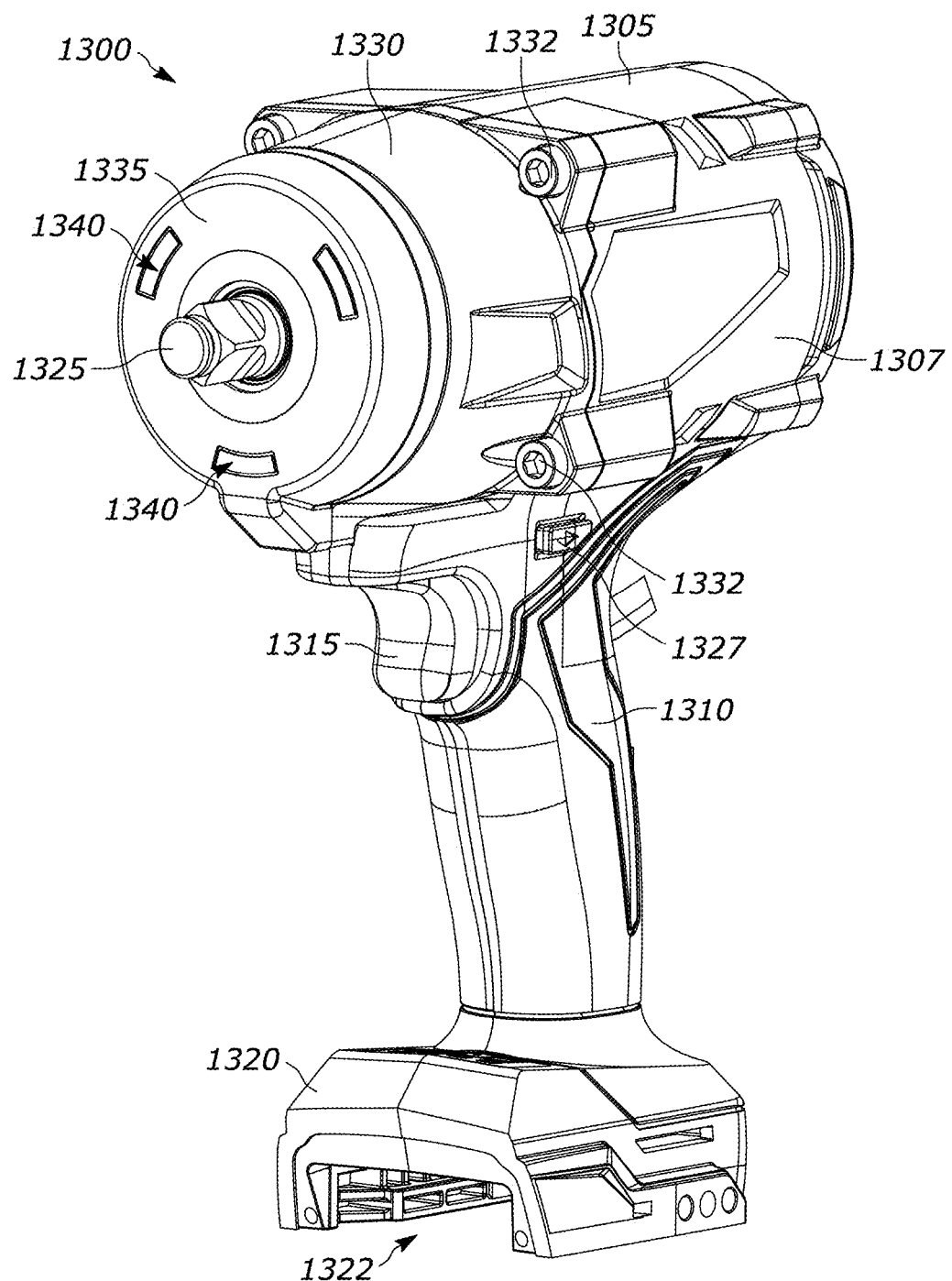
FIG. 13 illustrates a power tool, according to some embodiments described herein.

Turning to other embodiments of the disclosure, FIG. 13 illustrates a power tool 1300 that includes a shadowless lighting system according to one example embodiment. The power tool 1300 includes a primary housing 1305. The primary housing 1305 may be a main body of the power tool 1300. The primary housing 1305 may be configured to house a motor (e.g., a brushed motor, a brushless direct current (BLDC) motor, or the like) in an upper portion 1307 of the primary housing 1305. Accordingly, the primary housing 1305 (in the example instance disclosed, the upper portion 1307 of the primary housing 1305) may also be referred to as a motor housing. However, the primary/motor housing 1305 may be located in other locations of a power tool in other instances (e.g., on other types of power tools). In some embodiments, the primary housing 1305 is formed from two pieces of plastic configured to mate (e.g., a clamshell housing), such that an interior cavity is formed within the primary housing 1305. A portion of the primary housing 1305 may be formed into a handle 1310 to allow a user to hold the power tool 1300. A trigger 1315 may be positioned on the handle 1310 to allow a user to actuate the trigger 1315 to variably control at least one parameter of the power tool 1300. In some embodiments, the parameter may be an amount of power supplied to a motor of the power tool 1300. The primary housing 1305 may further include a connection portion 1320 (i.e., a foot portion of the power tool 1300) that may include an interface 1322 (i.e., a battery pack interface 1322) configured to removably couple to a battery pack (not shown). The interface 1322 may include electrical contacts to allow power to be transferred from the battery pack to the power tool 1300 (e.g., to provide power to the motor and other components of the power tool 1300). The power tool 1300 further includes an output device 1325 (e.g., a bit/tool holder) on one end of the upper portion 1307 of the primary housing 1305 to provide an output of the power tool. For example, the output of the power tool may be a rotational output, an impacting output, a reciprocating output, etc. In some embodiments, the output device 1325 may include a fitting (e.g., a chuck, a collet, or the like) to removably couple an end tool (e.g., a tool bit) to the output device 1325. In other embodiments, the output device 1325 may be formed such that a fastener directly removably couples to the output device 1325 to perform a loosening or tightening operation of the fastener. In some embodiments, the power tool 1300 includes a forward/reverse switch 1327 configured to allow a user to select a rotational direction of the output device 1325.

The power tool 1300 further includes a secondary housing 1330 separate from the primary housing 1305. The secondary housing 1330 may be configured to house a transmission mechanism/device 1405 of the power tool 1300 configured to transmit rotational energy from a motor of the power tool 1300 to the output device 1325. In some embodiments, the secondary housing 1330 is a gear case, a hammer case, or the like. The secondary housing 1330 may be made of metal and/or plastic. The secondary housing 1330 may be positioned such that an end surface of the secondary housing 1330 contacts at least a portion of an end surface of the primary housing 1305. For example, as shown in FIG. 13, a rear end of the secondary housing 1330 may be fastened to a front end of the upper portion 1307 of the primary housing 1305 using fasteners 1332. In some instances, the power tool 1300 may not include the secondary housing 1330. For example, other types of power tools 1300 may not include the secondary housing 1330.

The power tool 1300 further includes a retaining portion 1335 (i.e., cover 1335 or lighting assembly 1335) configured to emit light to a work area as described in further detail below. In some embodiments, the cover 1335 is configured to surround the output device 1325. The cover 1335 may include one or more openings 1340 to allow at least a portion of a light diffuser 1615 (see FIGS. 16A-16D) to emit light from a light source through the openings 1340 to a work area.

The particular power tool 1300 illustrated and described herein (e.g., an impact wrench) is merely an example. The lighting assembly 1335 and/or the associated optical fiber designs disclosed herein may also be implemented on other types of power tool devices including other power tools (e.g., the power tool 100 of FIG. 1), battery packs, battery chargers, other power tools, test and measurement equipment, vacuum cleaners, worksite radios, outdoor power equipment, non-motorized tools for task lighting applications, and vehicles. Power tools can include drills, circular saws, jig saws, band saws, reciprocating saws, screw drivers, angle grinders, straight grinders, hammers, multi-tools, impact wrenches, rotary hammers, impact drivers, angle drills, pipe cutters, grease guns, sanders, trim routers, and the like. Battery chargers can include wall chargers, multi-port chargers, travel chargers, and the like. Test and measurement equipment can include digital multimeters, clamp meters, fork meters, wall scanners, IR thermometers, laser distance meters, laser levels, remote displays, insulation testers, moisture meters, thermal imagers, inspection cameras, and the like. Vacuum cleaners can include stick vacuums, hand vacuums, upright vacuums, carpet cleaners, hard surface cleaners, canister vacuums, broom vacuums, and the like. Outdoor power equipment can include blowers, chain saws, edgers, hedge trimmers, lawn mowers, trimmers, and the like. Other non-motorized devices that may make use of the lighting assembly 1335 and/or the optical fiber designs may include electronic key boxes, calculators, cellular phones, head phones, cameras, motion sensing alarms, flashlights, worklights, weather information display devices, a portable power source, a digital camera, a digital music player, a radio, and multi-purpose cutters.

Figure 14:
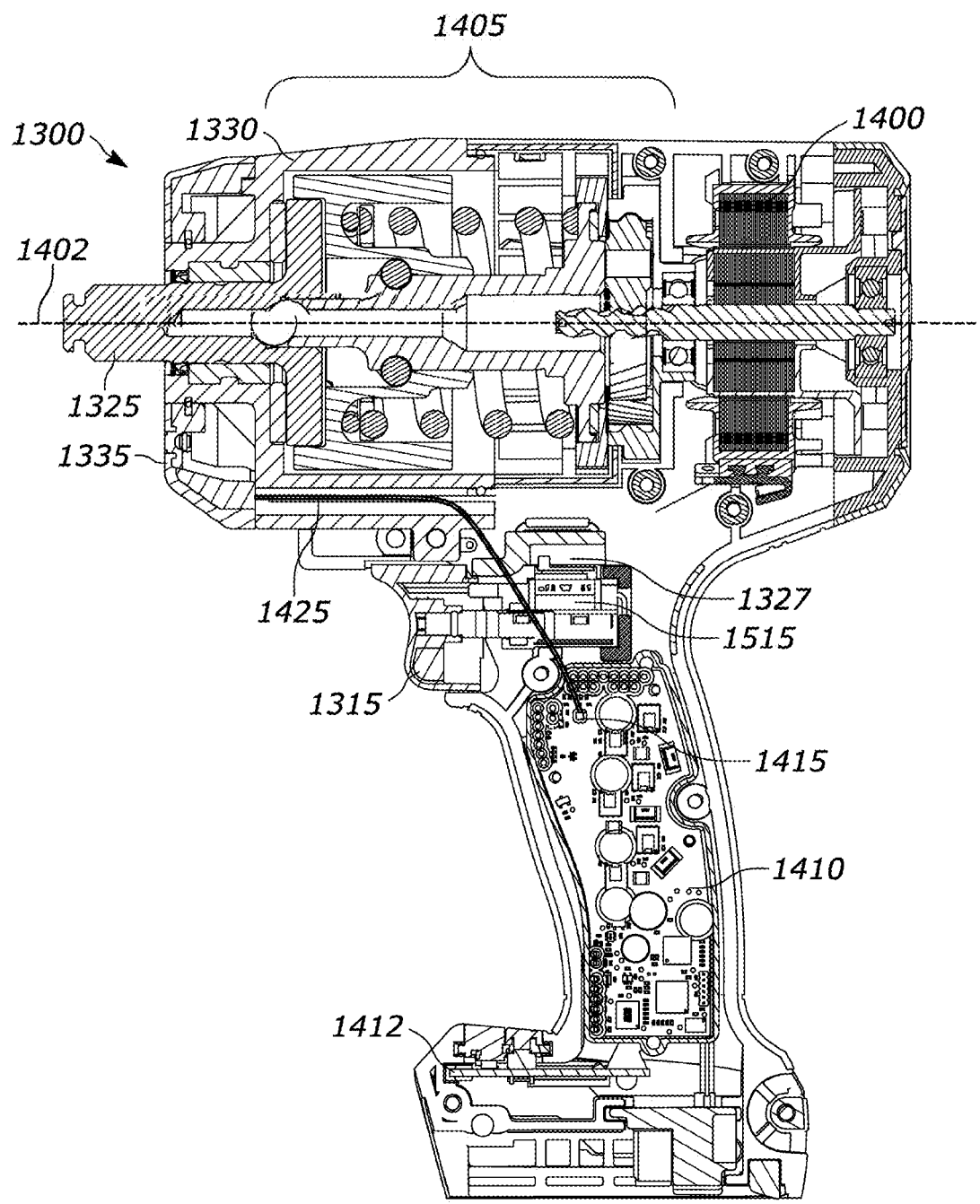
FIG. 14 illustrates a cross-sectional view of the power tool of FIG. 13, according to some embodiments described herein.

FIG. 14 illustrates a cross-sectional view of the power tool 1300 according to one example embodiment. The power tool 1300 includes a motor 1400 configured to provide a rotational output about an axis 1402 (i.e., a motor axis 1402 or output axis 1402). The power tool 1300 further includes a transmission mechanism/device 1405 configured to transfer the rotational output of the motor 1400 to the output device 1325. The transmission mechanism 1405 may be a gear transmission mechanism, an electronic transmission mechanism, an impacting transmission mechanism, a combination of multiple types of transmission mechanism, or the like. In some instances, the transmission mechanism 1405 may merely include a connection between a motor spindle and an output spindle (or a single motor/output spindle), for example, for tools that have direct drive operation. At least a portion of the transmission mechanism 1405 may be positioned within the secondary housing 1330.

In some embodiments, the transmission mechanism 1405 of the power tool 1300 includes an impact mechanism that includes hammer with outwardly extending lugs and an anvil with outwardly extending lugs. The anvil may be coupled to the output device 1325. During operation, impacting occurs when the anvil encounters a certain amount of resistance, e.g., when driving a fastener into a workpiece. When this resistance is met, the hammer may continue to rotate. A spring coupled to the back-side of the hammer causes the hammer to disengage the anvil by axially retreating. Once disengaged, the hammer will advance both axially and rotationally to again engage (i.e., impact) the anvil. When the impact mechanism is operated, the hammer lugs impact the anvil lugs every 180 degrees, for example. Accordingly, when the power tool 1300 is impacting during operation, the hammer rotates 180 degrees without the anvil, impacts the anvil, and then rotates with the anvil a certain amount before repeating this process.

The power tool 1300 may further include a printed circuit board (PCB) 1410 located in the handle 1310 and a PCB 1412 located in the connection portion 1320. One or both of the PCBs 1410 and 1412 (and/or one or more other PCBs within the power tool 1300) include one or more electronic components that may implement a control system of the power tool 1300. In some embodiments, the PCB 1412 includes an electronic processor 1550 (see FIG. 15) configured to receive power from a power supply connected to the power tool 1300 (e.g., a battery pack connected to the power tool 1300 via the interface 1322). The electronic processor 1550 may be configured to control whether power is provided to the light source and/or the motor 1400. The PCB 1410 may include switching elements 1545 (e.g., field-effect transistors 1545) that are controlled by the electronic processor 1550 to selectively provide power to coils of the motor 1400 to allow operation thereof. In other embodiments, the PCBs 1410 and 1412 may include additional or alternative components. For example, the components located on each PCB 1410 and 1412 as described above may be located on the other PCB 1410 and 1412.

The PCB 1410 may also include a light source 1415 (e.g., LED 1415) that may provide light that is used to illuminate a work area of the power tool 1300. For example, one or more LEDs 1415 may be surface mounted to either side of the PCB 1410. In some embodiments, one or more optical fibers 1425 (e.g., similar to optical fibers 405 explained previously herein) may be coupled (e.g., optically coupled) to the LED 1415 (see FIGS. 18-19 and 9A-11D) in order to provide an illumination pathway for light to travel from the light source 1415 to the exterior of the power tool 1300 to illuminate a work area. The optical fiber 1425 may be made of any suitable material (e.g., plastic, glass, polymer composites, glass-polymer composites etc.) to effectively direct the light output from the LED 1415 to the light diffuser 1615. For example, the optical fiber 1425 may be made of a flexible polymer, allowing the optical fiber 1425 to navigate curves or corners within the power tool housing 1305. Accordingly, the LED 1415 may emit light into one end of the optical fiber 1425 for the light to be emitted at an external surface of the power tool 1300 via an opposite end of the optical fiber 1425. In some embodiments, there may be a plurality of LEDs 1415 each coupled (e.g., optically and/or physically coupled) to a corresponding optical fiber 1425 of a plurality of optical fibers 1425. In some embodiments, the optical fiber 1425 may include a plurality of strands, wherein each strand may be coupled (e.g., optically and/or physically coupled) to a corresponding LED 1415. In some embodiments, the optical fiber 1425 may include a larger strand at its first end coupled (e.g., optically and/or physically coupled) to the light source 1415 where the larger strand splits into smaller strands at some point along a length of the optical fiber 1425 (at the second end of the optical fiber 1425). The smaller strands may then be routed to different areas of the light diffuser 1615 (e.g., around the output axis 1402) to allow light to be output from different areas of the light diffuser 1615 in a more uniform manner than if light was output from the light diffuser 1615 in a single area. In some embodiments, the optical fiber 1425 may include a first plurality of strands at one end to respectively couple (e.g., optically and/or physically coupled) to different LEDs 1415. Such an optical fiber 1425 may combine into a single larger strand in its middle section and then split into a second plurality of strands at a second end opposite of the first end to be routed to different areas of the light diffuser 1615 (e.g., around the output axis 1402). In some of such embodiments, an amount of the first plurality of strands is the same as or different than an amount of the second plurality of strands. In some embodiments, each optical fiber 405 may be part of a fiber optic cable that may include multiple optical fiber strands, a jacket (e.g., a plastic jacket around one or more optical fibers), and/or insulation material. In some embodiments, the light diffuser 1615 may not be used. In such embodiments, the optical fibers 1425 may pass into and/or through an opening in the cover 1335 and/or in the housing 1305, 1330 to emit light to a work area (e.g., in a similar manner as shown in FIGS. 12A-12B with respect to the indicator mount 915 as explained previously herein). In such embodiments, an output end of the optical fibers 1425 may be polished to achieve a uniform light output.

Although FIGS. 9A-12B show an illumination assembly 900 for use with four indicator light sources 325, in some instances, the same or a similar illumination assembly may be used to provide an illumination pathway from the light source(s) 1415 to the light diffuser 1615 and/or the external surface of the power tool 1300. For example, the potting dam connector 905 and the illumination assembly harness 920 may be designed to provide an illumination pathway for different amounts of LEDs in different configurations. Similarly, the optical fibers 405 of the illumination assembly harness 920 may be made longer or shorter and may be installed in different manners (e.g., with different curves/bends, etc.) to allow the illumination assembly 900 to be used in other situations such as with the light source(s) 1415 of the power tool 1300.

As shown in FIG. 14, the optical fiber 1425 is routed from the PCB 1410 located in the handle 1310 of the power tool 1300 to the light diffuser 1615 in the cover 1335. For example, the optical fiber 1425 may be routed around a trigger switch 1515 associated with the trigger 1315 and underneath the secondary housing 1330 as shown in FIG. 14. As another example, the optical fiber 1425 may be routed through a through-hole 1725 in a lower portion of the secondary housing 1330 (see FIG. 17A). In some instances, the optical fiber 1425 and/or additional optical fibers 1425 are routed on other sides of the secondary housing 1330 (e.g., on either lateral side of the secondary housing 1330, on top of the secondary housing 1330, through other through-holes in the secondary housing 1330 that are located in other locations besides the location of the through-hole 1725 shown in FIG. 17A). In some embodiments, the optical fiber(s) 1425 may be routed through other spaces located within the primary housing 1305 and/or around or through the secondary housing 1330. The optical fiber(s) 1425 may be routed in many different locations within the power tool 1300 depending on different types of tools/devices of the power tool 1300 (e.g., depending on the location of the light source 1415 and the location of a desired light output area of the power tool 1300).

Figures 20A, 20B:
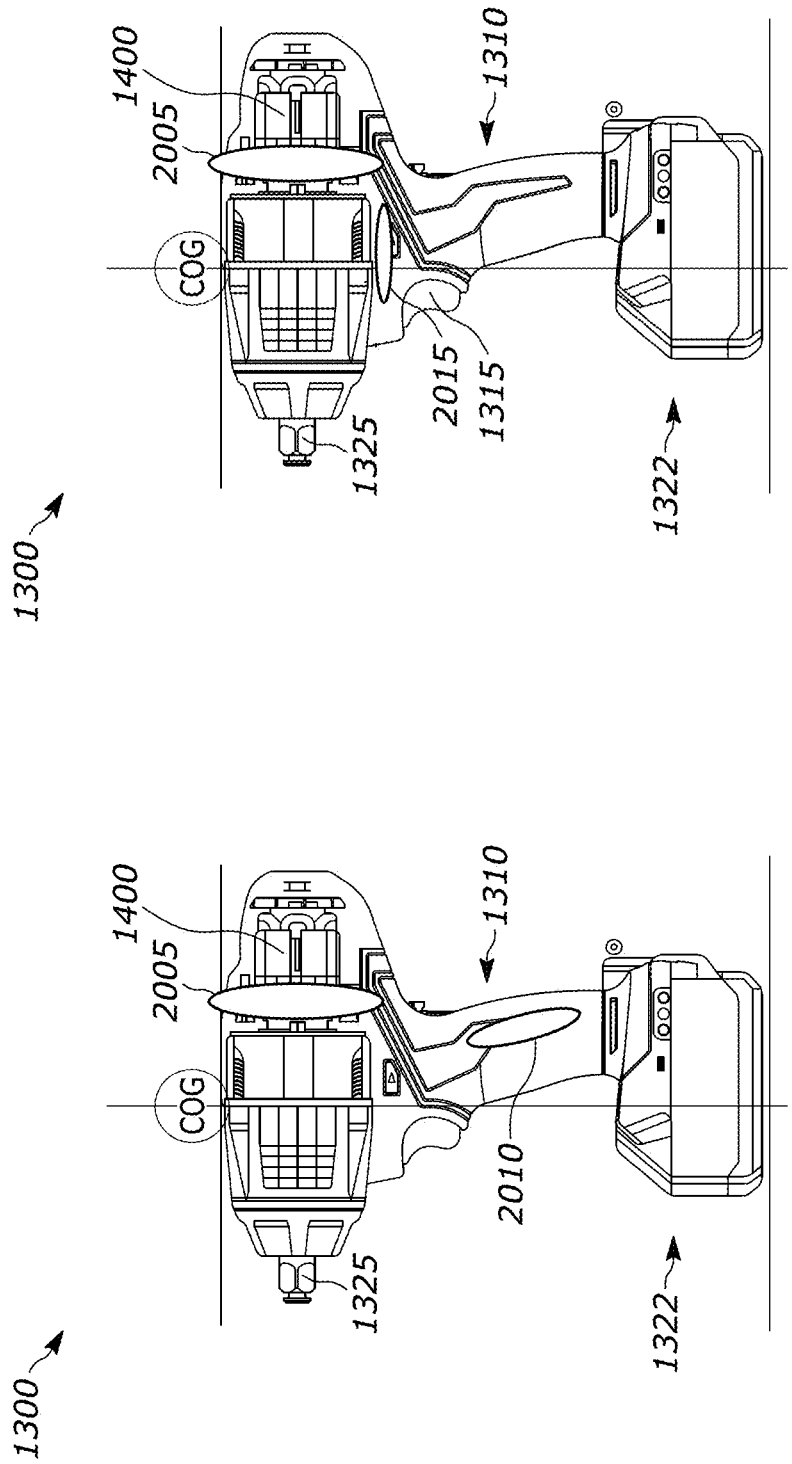
FIGS. 20A-20C illustrate example printed circuit board (PCB) locations that are locations at which a PCB may be located within the power tool of FIG. 13, according to some embodiments described herein.
Figure 20C:
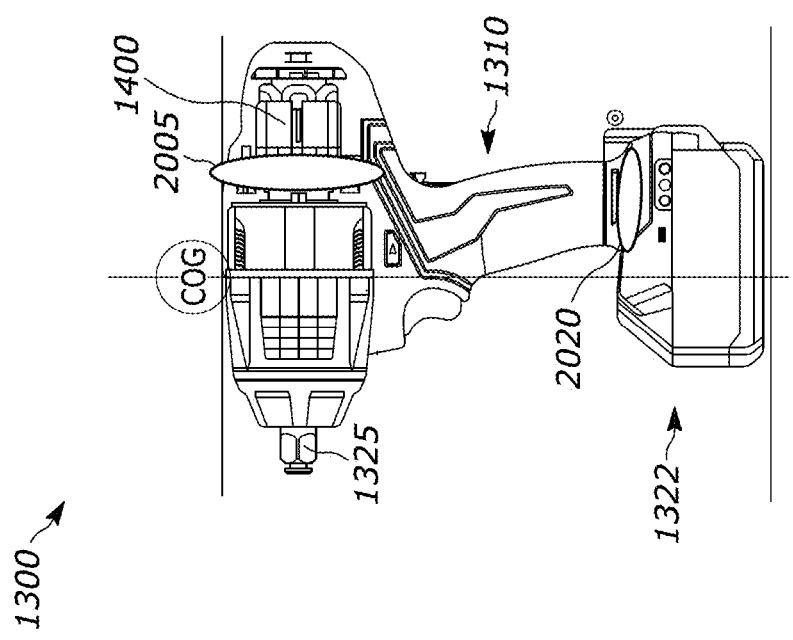

The location of the light source 1415 shown in FIG. 14 is merely an example. In some instances, the light source 1415 may be located at a different location on the PCB 1410 than the example location shown in FIG. 14. Although the light source 1415 is shown and described as being located on the PCB 1410, the light source 1415 may be located on other PCBs (e.g., the PCB 1412) that are located at other locations within the power tool 1300. For example, the PCBs 1410, 1412 or other PCBs may be located at example locations within the power tool 1300 as shown in FIGS. 20A-20C. For example, the power tool 1300 may include a Hall sensor PCB located at position 2005 in front of the motor 1400. In other embodiments, the Hall sensor PCB may be located behind the motor 1400 or the Hall sensor PCB may not be present within the power tool 1300. FIGS. 20A, 20B, and 20C illustrate example board locations 2010, 2015, and 2020, respectively, which are locations at which a PCB (e.g., PCB 1410, 1412, or another PCB) may be located within the power tool 1300. For example, as shown in FIG. 14, a PCB may be located in the handle 1310 of the power tool 1300 at the location 2010, which is similar to the location of the PCB 1410 shown in FIG. 14. As shown in FIG. 20B, a PCB may be located above the trigger 1315 and the handle 1310 but below the motor 1400 and the transmission mechanism 1405 and/or the secondary housing 1330 at the location 2015. As shown in FIG. 20C, a PCB may be located below the handle 1310 and above the battery pack interface 1322 at the location 2020, which is similar to the location of the PCB 1412 shown in FIG. 14. Additional and/or alternative PCBs may be located in other locations within the power tool that are not shown in FIGS. 20A-20C. The light source 1415 may be located (e.g., surface mounted) on either side of any PCB that is included within the power tool 1300. Optical fiber(s)

1425 may be used to route/guide light from the light source 1415 to the light diffuser 1615 or otherwise to the external surface of the power tool 1300 to output the light to a work area.

Figure 15:
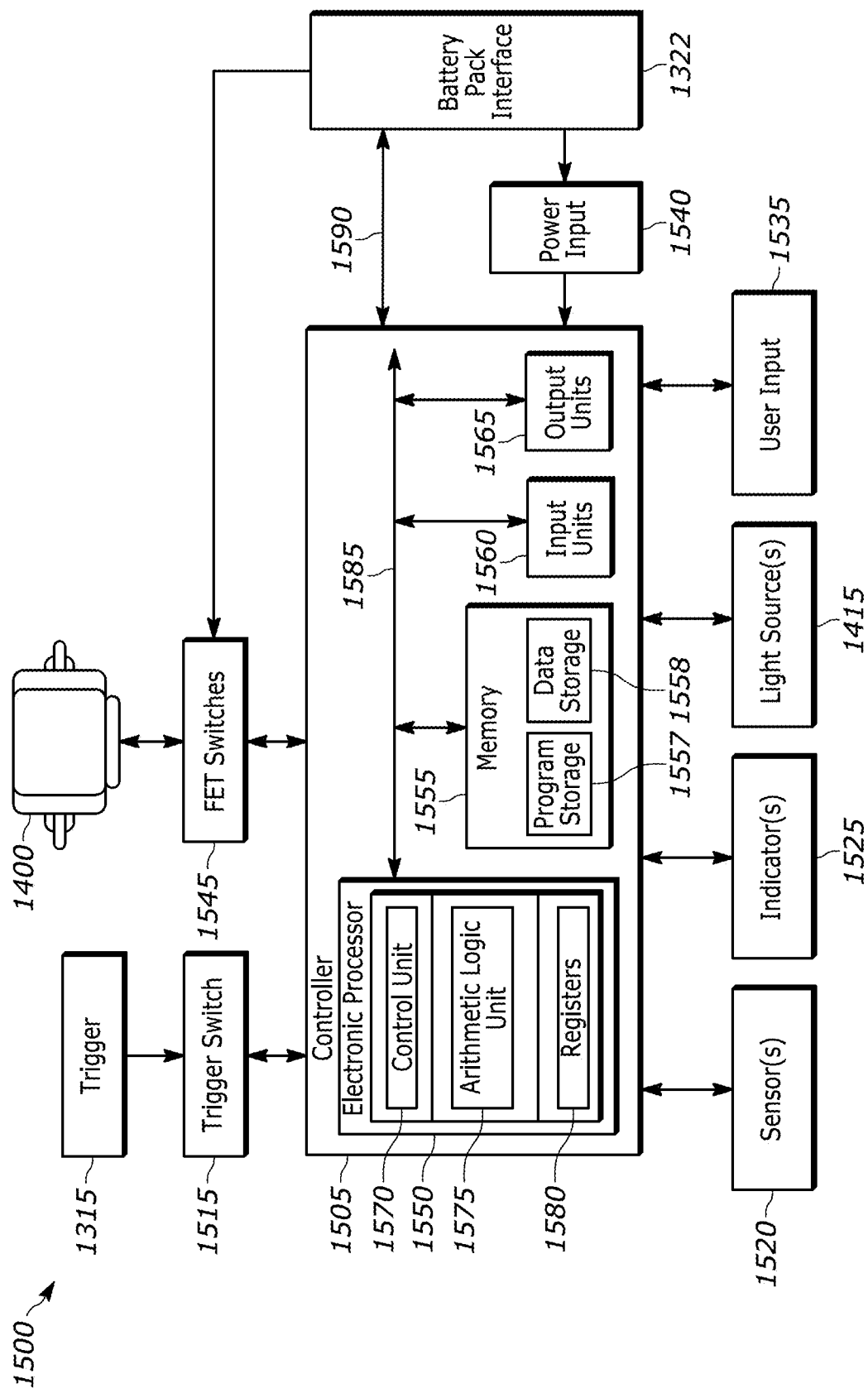
FIG. 15 illustrates a block diagram of the power tool of FIG. 13, according to some embodiments described herein.

FIG. 15 illustrates a block diagram 1500 of the power tool 1300 according to one example embodiment. In some instances, the power tool 1300 has many similar components as the power tool 100 that function in a similar manner as explained previously herein. Accordingly, the block diagram 1500 of FIG. 15 is similar to that of FIG. 3. In some instances, similar descriptions of components from FIG. 3 apply to like-named components of FIG. 15. The power tool 1300 may include a controller 1505. The controller 1505 is electrically and/or communicatively connected to a variety of modules or components of the power tool 1300. For example, as illustrated by FIG. 15, the controller 1505 is electrically connected to the motor 1400, a battery pack interface 1322, a trigger switch 1515 (connected to the trigger 1315), one or more sensors or sensing circuits 1520, one or more indicators 1525 (e.g., indicator light sources 1525 that are configured to be controlled to illuminate a status of the power tool 1300), one or more light sources 1415 (e.g., LEDs 1415 configured to illuminate a work area), a user input 1535 (e.g., switches, buttons, a mode pad, etc.), power input circuitry 1540, and switching elements 1545 (e.g., FET switches 1545). The controller 1505 includes combinations of hardware and software that are operable to, among other things, control the operation of the power tool 1300, monitor the operation of the power tool 1300, activate the one or more indicators 1525 and/or light sources 1415, etc.

The controller 1505 includes a plurality of electrical and electronic components that provide power, operational control, and protection to the components and modules within the controller 1505 and/or the power tool 1300. For example, the controller 1505 includes, among other things, an electronic processor 1550 (e.g., a microprocessor, a microcontroller, or another suitable programmable device), a memory 1555, input units 1560, and output units 1565. The electronic processor 1550 includes, among other things, a control unit 1570, an arithmetic logic unit (ALU) 1575, and a plurality of registers 1580 (shown as a group of registers in FIG. 15), and is implemented using a computer architecture (e.g., a modified Harvard architecture, a von Neumann architecture, etc.). The electronic processor 1550, the memory 1555, the input units 1560, and the output units 1565, as well as the various modules or circuits connected to the controller 1505 are connected by one or more control and/or data buses (e.g., common bus 1585). The control and/or data buses are shown generally in FIG. 15 for illustrative purposes. The use of one or more control and/or data buses for the interconnection between and communication among the various modules, circuits, and components would be understood by a person skilled in the art in view of the embodiments described herein.

The memory 1555 is a non-transitory computer readable medium and includes, for example, a program storage area 1557 and a data storage area 1558. The program storage area 1557 and the data storage area 1558 can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The electronic processor 1550 is connected to the memory 1555 and executes software instructions that are capable of being stored in a RAM of the memory 1555 (e.g., during execution), a ROM of the memory 1555 (e.g., on a generally permanent basis), or another non-transitory computer readable medium such as another memory or a disc. Software included in the implementation of the power tool 1300 can be stored in the memory 1555 of the controller 1505. The software includes, for example, firmware, one or more applications, program data, filters, rules, one or more program modules, and other executable instructions. The controller 1505 is configured to retrieve from the memory 1555 and execute, among other things, instructions related to the control processes and methods described herein. In other constructions, the controller 1505 includes additional, fewer, or different components.

In some instances, the electronic processor 1550 that performs the actions and/or methods described herein may include any one or a combination of electronic processors located within the controller 1505 and/or within the power tool 1300. Thus, in the claims, if an apparatus or system is claimed, for example, as including an electronic processor or other element configured in a certain manner, for example, to make multiple determinations, the claim or claim element should be interpreted as meaning one or more electronic processors (or other element) where any one of the one or more electronic processors (or other element) is configured as claimed, for example, to make some or all of the multiple determinations. To reiterate, those electronic processors and processing may be distributed within the power tool 1300.

The battery pack interface 1322 includes a combination of mechanical components (e.g., rails, grooves, latches, etc.) and electrical components (e.g., one or more terminals) configured to and operable for interfacing (e.g., mechanically, electrically, and communicatively connecting) the power tool 1300 with a battery pack. For example, power provided by the battery pack to the power tool 1300 is provided through the battery pack interface 1322 to the power input circuitry 1540. The power input circuitry 1540 includes combinations of active and passive components to regulate or control the power received from the battery pack prior to power being provided to the controller 1505. The battery pack interface 1322 may also supply power to the FET switches 1545 that are configured to selectively provide power to the motor 1400 based in accordance with instructions from the controller 1505. The battery pack interface 1322 also includes, for example, a communication line 1590 configured to allow for communication between the controller 1505 and the battery pack.

The indicators 1525 include, for example, one or more light-emitting diodes ("LEDs"). The indicators 1525 can be configured to display conditions of, or information associated with, the power tool 1300. For example, the indicators 1525 are configured to indicate measured electrical characteristics of the power tool 1300, the status of the device, etc. The user input 1535 is operably coupled to the controller 1505 to, for example, select a forward mode of operation or a reverse mode of operation, a torque and/or speed setting for the power tool 1300 (e.g., using torque and/or speed switches or a mode pad), etc. In some embodiments, the user input 1535 includes a combination of digital and analog input or output devices required to achieve a desired level of operation for the power tool 1300, such as one or more knobs, one or more dials, one or more switches, one or more buttons, a mode pad, etc. In some instances, the indicators 1525 may include the indicator light sources 325 and associated optical fibers 405 described previously herein with respect to FIGS. 1-12B.

In some embodiments, the controller 1505 (specifically, the electronic processor 1550) is configured to control whether power is provided to the light source(s) 1415. In some embodiments, the controller 1505 may receive power from a power supply of the power tool 1300 and provide power to the light source(s) 1415 directly. In such embodiments, the controller 1505 may condition received power as appropriate before providing power to the light source(s) 1415, for example, via traces on the PCB 1410 to which the light source(s) 1415 is mounted. In other embodiments, the light source(s) 1415 may be electrically connected to the power supply (e.g., to the battery pack via the battery pack interface 1322 and one or more wires that connect the battery pack interface 1322 to the PCB 1410 to which the light source(s) 1415 is mounted) with a switch between the light source(s) 1415 and the power supply. In such embodiments, the controller 1505 may control the switch to allow or disallow power from be provided to the light source(s) 1415. In such embodiments, the electrical path from the power supply to the light source(s) 1415 may include conditioning circuitry similar to the power input circuitry 1540 to regulate or control the power received by the light source(s) 1415 from the power supply. In some embodiments, the controller 1505 controls the light source(s) 1415 to be illuminated in response to determining that the trigger 1315 has been actuated.

The controller 1505 may be configured to monitor tool conditions using the sensors 1520. For example, the controller 1505 may be configured to determine whether a fault condition of the power tool 1300 is present and generate one or more control signals related to the fault condition. In some embodiments, the sensors 1520 include one or more current sensors, one or more speed sensors, one or more Hall Effect sensors, one or more temperature sensors, etc. The controller 1505 calculates or includes, within memory 1555, predetermined operational threshold values and limits for operation of the power tool 1300. For example, when a potential thermal failure (e.g., of a FET, the motor 1400, etc.) is detected or predicted by the controller 1505, power to the motor 1400 can be limited or interrupted until the potential for thermal failure is reduced. If the controller 1505 detects one or more such fault conditions of the power tool 1300 or determines that a fault condition of the power tool 1300 no longer exists, the controller 1505 is configured to provide information and/or control signals to another component of the power tool 1300 (e.g. the battery pack interface 1322, the indicators 1525, etc.). In some embodiments, the controller 1505 is configured to control an output of the light source(s) 1415 to indicate information to a user about a tool condition of the power tool 1300 (e.g., by flashing the light source(s) 1415 a predetermined number of times to indicate different types of fault conditions). In some embodiments, the controller 1505 is configured to control an output of different light sources 1415 differently/individually to indicate information to a user.

Figure 16A:
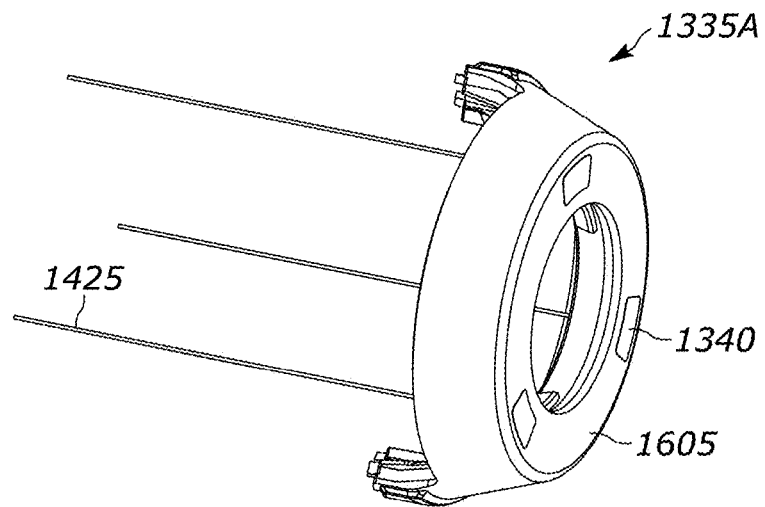
FIGS. 16A and 16B respectively illustrate a front perspective view of different covers of the power tool of FIG. 13 and associated optical fibers, according to some embodiments described herein.
Figure 16B:
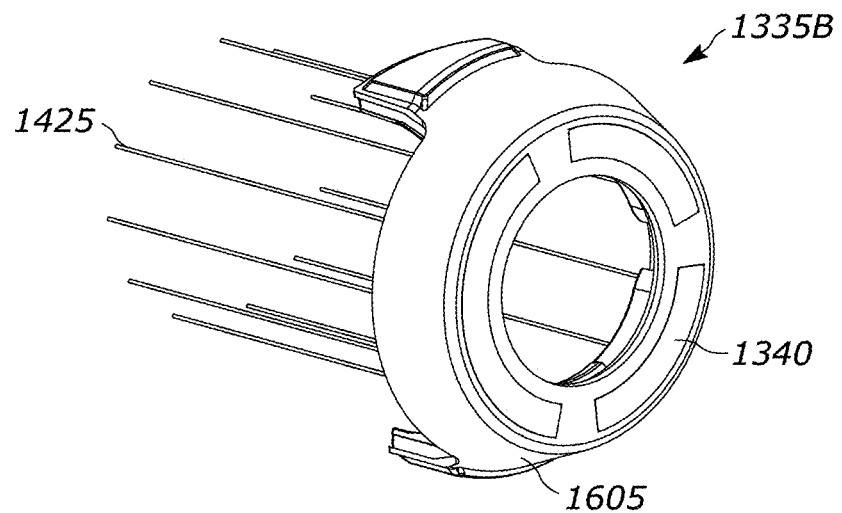
Figure 16C:
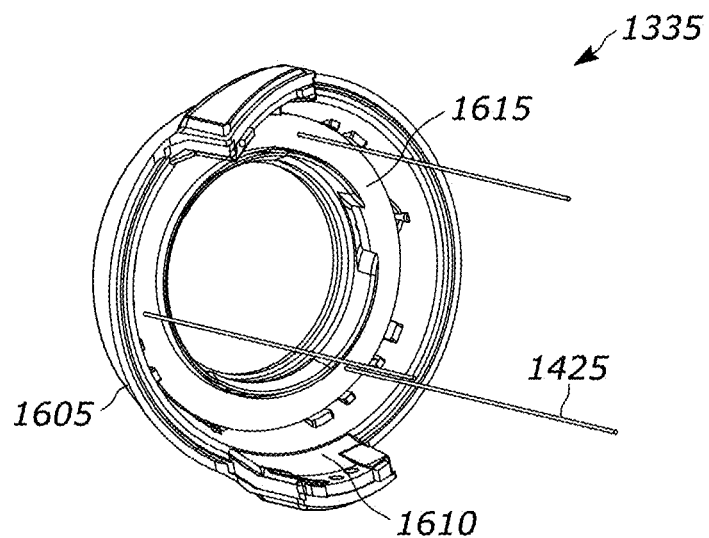
FIG. 16C illustrates a rear perspective view of the cover of FIG. 16A, according to some embodiments described herein.
Figure 16D:
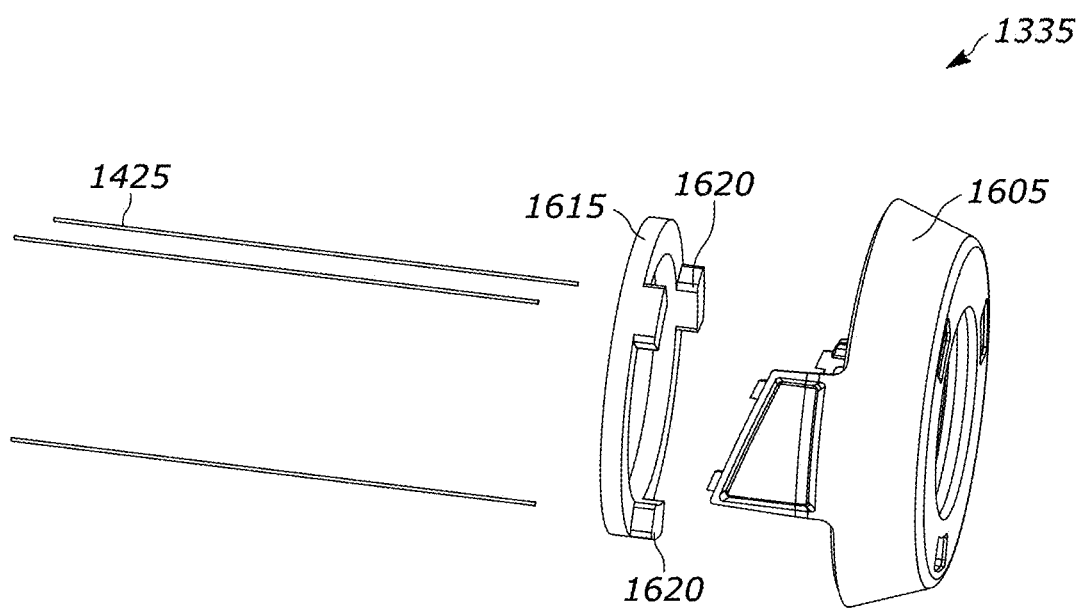
FIG. 16D illustrates an exploded view of the cover of FIG. 16A, according to some embodiments described herein.

FIGS. 16A and 16B illustrate front perspective views of example embodiments of covers 1335A, 1335B, respectively, configured to cover at least a portion of a front surface of the secondary housing 1330. FIGS. 16C and 16D respectively illustrate a rear view and an exploded view of the cover 1335 according to some example embodiments. As shown in FIGS. 16C and 16D, the cover 1335 may include multiple parts/components that couple together to form the cover 1335. For example, the cover 1335 may include an outer portion 1605 (e.g., overmolded portion 1605) that surrounds and/or is overmolded onto an inner portion 1610. In some instances, the outer portion 1605 is made of an opaque material such that light can only be emitted through the openings 1340 in the outer portion 1605. For example, the outer portion 1605 may be configured to block light from being emitted from at least a portion of the light diffuser 1615. In some instances, the outer portion 1605 may be made of rubber. In some instances, the inner portion 1610 is made of a transparent material such that light can be emitted through most portions or any portion of the inner portion 1610. In some instances, the inner portion 1610 may be made of a plastic/resin. The inner portion 1610 and the outer portion 1605 may include protruding features and/or corresponding indentations to allow the inner portion 1610 to be secured to the outer portion 1605.

The cover 1335 may also include a light diffuser 1615 (e.g., light diffuser ring 1615) configured to be coupled to a rear/inside surface of the inner portion 1610. The light diffuser 1615 may surround the output axis 1402 of the power tool 1300. The light diffuser 1615 may be made of a transparent and/or reflective material (e.g., on some interior surfaces of the light diffuser 1615) such that light within the light diffuser 1615 can both propagate within the light diffuser 1615 while also being emitted out of a front surface of the light diffuser 1615. For example, the light diffuser 1615 may cause light emitted from the power tool 1300 to be illuminated in an approximately uniform manner (i.e., approximately uniform light distribution) through the front surface of the light diffuser 1615 to reduce or eliminate shadows cast by the output device 1325 and/or a tool/bit attached thereto. In some instances, the front surface of the light diffuser 1615 includes a frosted surface and/or a lensing geometry to disperse light in an approximately uniform manner or otherwise direct light in a certain direction(s). For example, the frosted surface may include one or both of (i) a frosted coating and (ii) a surface texturing on the front surface to render a frosted look without applying a frosted coating. For example, the surface texturing may include a pattern of lines/indentations on the front surface of the light diffuser 1615 that are generated during molding of the light diffuser 1615. In some instances, when emitting light, the light diffuser 1615 redirects the light received from the optical fiber(s) 1425 in a different direction (e.g., a five degree change in direction, a ten degree change in direction, a 20 degree change in direction, a 90 degree change in direction, and/or the like). For example, the light diffuser 1615 may disperse light in a direction slightly outward/away from the output axis 1402 to reduce or prevent shadows caused by the output device 1325 and/or a device (e.g., tool bit, etc.) coupled to the output device 1325.

In some instances, the light diffuser 1615 is clipped/press fit into clips/protrusions on an inner surface of the inner portion 1610 to secure the light diffuser 1615 to the inner portion 1610. Although the light diffuser 1615 is shown as a separate piece/component than the inner portion 1610 of the cover 1335, in some instances, the light diffuser 1615 may be integrally molded with the inner portion 1610 of the cover 1335, for example, as a single transparent piece.

In some instances, the light diffuser 1615 may include one or more protrusions 1620 (e.g., three protrusions 1620) that are configured to protrude through the openings 1340 in the outer portion 1605 as shown in FIG. 16D. In some instances, the inner portion 1610 may include its own openings corresponding to the openings 1340 to allow the protrusions 1620 to protrude to be even/flush with or extend beyond a front surface of the outer portion 1605 of the cover 1335. As indicated in FIGS. 16A and 16B, the openings 1340 and the corresponding protrusions 1620 may vary in size in different embodiments. For example, FIG. 16B illustrates a cover 1335B with larger openings 1340 and protrusions 1620 than those of the cover 1335A shown in FIG. 16A. In some instances, the cover 1335 may include a ring-shaped opening 1340 and the protrusion 1620 may be a ring-shaped protrusion (e.g., to allow a full 360 degree ring of light emission from the front surface of the light diffuser 1615). In some instances, the outer portion 1605 may include additional or fewer openings 1340 each having a larger, smaller, or differently shaped surface area to allow for light to be emitted to a work area. In some instances, instead of the light diffuser 1615 being a single ring-shaped component, the cover 1335 may include separate arcuate light diffusers 1615 that are received in the openings 1340.

Figure 17A:
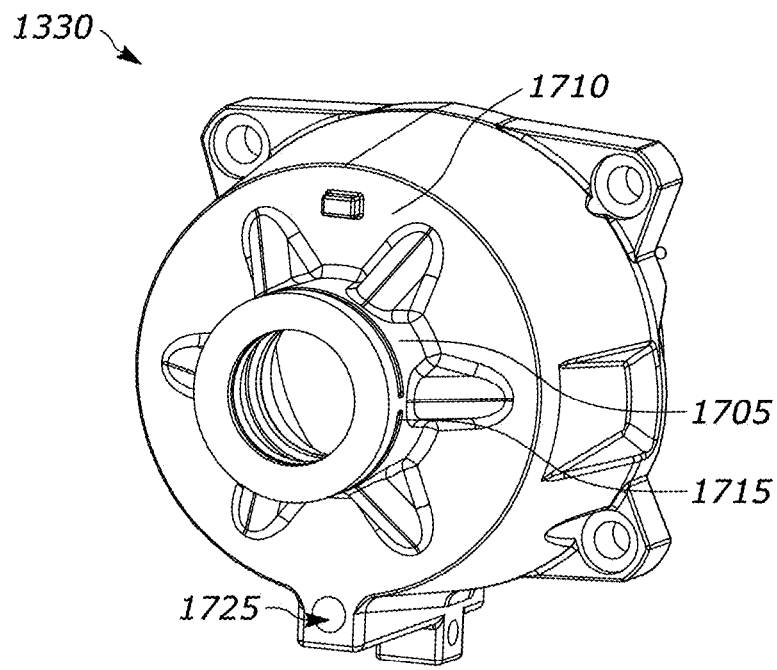
FIG. 17A illustrates a front perspective view of a secondary housing of the power tool of FIG. 13, according to some embodiments described herein.
Figure 17B:
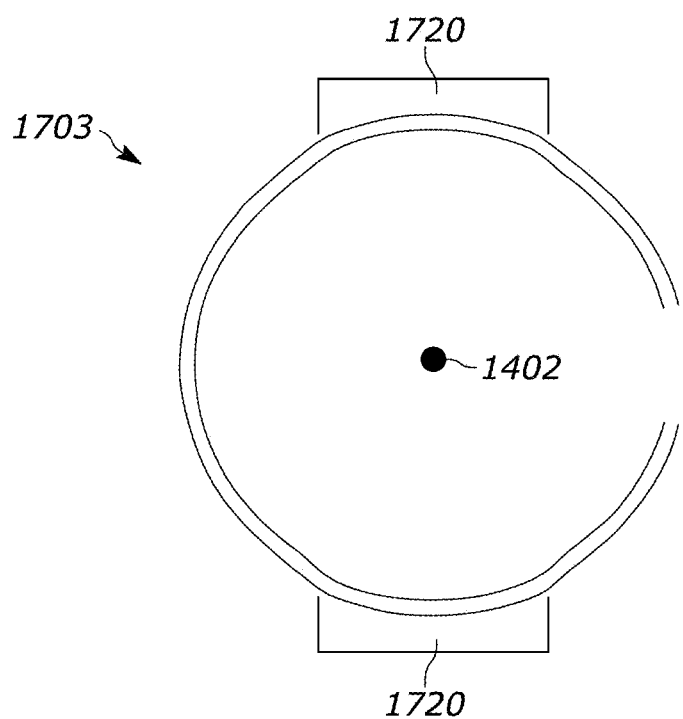
FIG. 17B illustrates a retention ring used to secure the cover of FIGS. 16A-16D to the secondary housing of FIG. 17A, according to some embodiments described herein.

FIG. 17A illustrates a front perspective view of the secondary housing 1330 according to some example embodiments. FIG. 17B illustrates a retention ring 1703 used to secure the cover 1335 of FIGS. 16A-16D to the secondary housing 1330 according to some example embodiments. As shown in FIG. 17A, the secondary housing 1330 may include a neck portion 1705 protruding forwardly from a front surface 1710. The neck portion 1705 may include one or more grooves 1715 configured to receive the retention ring 1703 (see FIG. 17B). Only a single groove 1715 is shown in the embodiment illustrated in FIG. 17A. The combination of the retention ring 1703 and the groove 1715 may securely hold the cover 1335 on the front surface 1710 of the secondary housing 1330. In some embodiments, the retention ring 1703 is approximately circular and may be a fully enclosed ring or a partially enclosed ring as shown in FIG. 17B. The retention ring 1703 may include protruding portions 1720 that protrude radially away from the output device 1325 and the output axis 1402. In some embodiments, a majority of the retention ring 1703 is located within the groove 1715 of the neck portion 1705 of the secondary housing 1330. However, the protruding portions 1720 may protrude outside of the groove 1715 to engage with corresponding radially inwardly protruding portions of the cover 1335 to hold/secure (e.g., snap fit) the cover 1335 to the secondary housing 1330.

Returning to FIGS. 16A-16D, one or more optical fibers 1425 may be coupled to a rear surface of the light diffuser 1615 to emit light from the light source 1415 into the light diffuser 1615 toward the work area. In some instances, each optical fiber 1425 may be adhered (e.g., using glue) within a receiving structure (e.g., an indent or a through-hole) provided on a rear side of the light diffuser 1615 (e.g., a receiving structure similar to holes 1215 and corresponding structure shown in FIGS. 12A-12B and described above with respect to the indicator mount 915). An end of the optical fiber 1425 coupled to the light diffuser 1615 may be a second/output end. The other end (i.e., a first end) of the optical fiber 1425 may be coupled to the light source 1415 (e.g., optically and/or physically coupled) using an optical fiber coupler 605 configured to cover the light source 1415 to prevent the light from the light source 1415 from being emitted in other directions besides through the optical fiber 1425 (see FIGS. 9A-11D and 18-19). In some instances, more or fewer optical fibers 1425 may be used than the amount shown in FIGS. 16A-16D.

Figure 18:
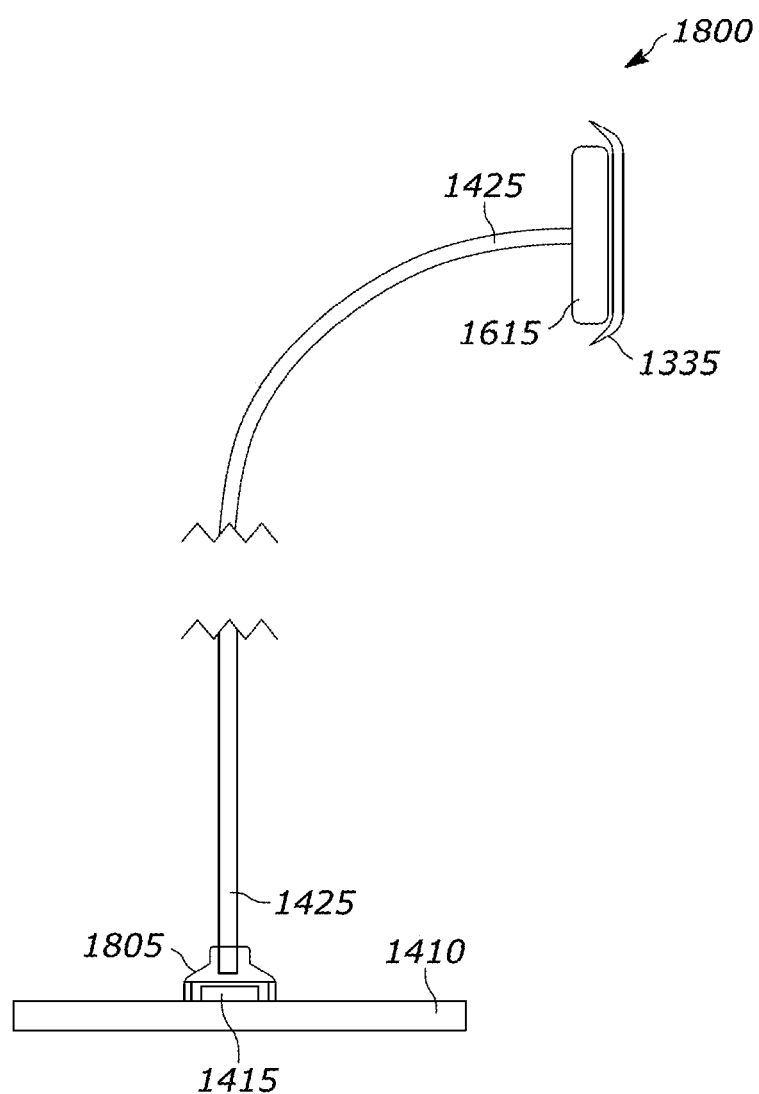
FIG. 18 illustrates a schematic diagram including components of an illumination pathway from a light source of the power tool of FIG. 13 to the cover of FIGS. 16A-16D, according to some embodiments described herein.

FIG. 18 illustrates a schematic diagram including components of an illumination pathway 1800 from the light source 1415 on the PCB 1410 to the cover 1335. As previously mentioned, the light source 1415 may be disposed on the PCB 1410 and coupled to the optical fiber 1425 via the optical fiber coupler/connector 605. The optical fiber coupler 605 is configured to mechanically/physically and optically couple the optical fiber 1425 to the light source 1415. In other embodiments, the optical fiber 1425 may be fastened to the LED 1415 without entirely covering the light source 1415. In some embodiments, the coupler 605 may be formed with an inner reflective layer. In some embodiments, the coupler 605 may be flexible (e.g., made of rubber or a similar material). In some embodiments, the optical fiber 1425 may be coupled to the PCB 1410 or may be directly fastened to the light source 1415. For example, the optical fiber 1425 may be directly adhered to the light source 1415. The light source 1415 may be adapted to illuminate at a reduced solid angle (e.g., adding a lens, modifying the LED housing, etc.). As shown schematically in FIG. 18 and as indicated in FIG. 14, in some instances, the light source 1415 emits light into the first end of the optical fiber 1425 in a first direction that is different from a second direction in which the light is emitted through the light diffuser 1615 by the second end of the optical fiber 1425. In other instances, the light source 1415 may emit light into the first end of the optical fiber 1425 in a first direction that is the same as or similar to a second direction in which the light is emitted into/through the light diffuser 1615 by the second end of the optical fiber 1425.

Figure 19:
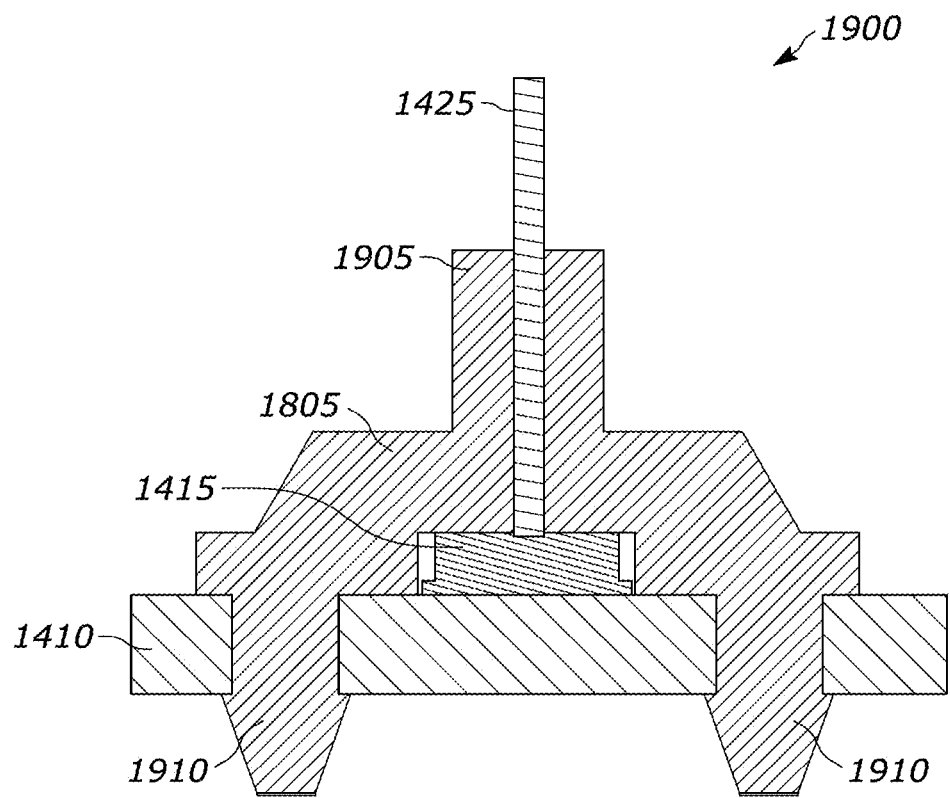
FIG. 19 illustrates a cross-sectional view of a connector/coupler used to secure an optical fiber to the light source of the power tool of FIG. 13, according to some embodiments described herein.

FIG. 19 illustrates a cross sectional view of an interface 1900 between the PCB 1410, the light source 1415, and the coupler 605. As shown, in some instances, the optical fiber 1425 is inserted into a protrusion 1905 of the coupler 605 to support and align the first end of the optical fiber 1425 with the light source 1415. In some instances, the coupler 605 is fastened to the PCB 1410 using protruding legs 1910 that are snap fit into through holes of the PCB 1410. In some instances, the coupler 605 is fastened to the PCB 1410 using a fastener such as a snap-rivet. In some embodiments, the optical fiber 1425 may be fastened into the protrusion 1905 of the coupler 605 using an adhesive (e.g., glue).

As mentioned previously herein, although FIGS. 9A-12B show an illumination assembly 900 for use with four indicator light sources 325, in some instances, the same or a similar illumination assembly may be used to provide the illumination pathway 1800 from the light source(s) 1415 to the light diffuser 1615 and/or to the external surface of the power tool 1300. For example, the coupler 1805 schematically shown in FIG. 18 may include the potting dam connector 905 and the second connector 910 of the illumination assembly 900 but modified for different amounts of LEDs 1415, different configurations of LEDs 1415, a different length or bend path of the optical fiber(s) 1425, etc. Continuing this example, the light diffuser 1615 and/or areas of the power tool 1300 where light is emitted from the end(s) of the optical fiber(s) 1425 may include an indicator mount similar to the indicator mount 915 shown in FIGS. 12A-12B and/or may include characteristics (e.g., elements 1205, 1210, 1215, 1220, and/or 1225) of the indicator mount 915 integrated into the light diffuser 1615 and/or the areas of the power tool 1300 where light is emitted. In the above example, the optical fiber(s) 1425 of the embodiments of FIGS. 13-20C may correspond to the optical fibers 405 of the embodiments of FIGS. 1-12B. As indicated by the above example, in some instances, the details disclosed with respect to the embodiments of FIGS. 1-12B may apply to the embodiments of FIGS. 13-20C and vice versa. In some instances, components of the embodiments disclosed in FIGS. 1-12B may be similar to (e.g., may have the same or similar functionality as) like-named components of the embodiments of FIGS. 13-20C and vice versa.

Thus, embodiments described herein provide, among other things, a power tool with optical fibers used to transmit light to an exterior of the power tool to provide status information about the power tool and/or to provide a work light for illuminating a work area of the power tool. Various features and advantages are set forth in the following claims.

We claim:

1. A power tool comprising:
   a primary housing;
   a motor situated within the primary housing;
   a circuit board located within the primary housing;
   a plurality of light sources mounted to the circuit board;
   an electronic processor configured to:
      determine a status of the power tool, of a battery pack coupled to the power tool, or of both the power tool and the battery pack, and
      control illumination of the plurality of light sources based on the status of the power tool, of the battery pack, or of both the power tool and the battery pack; and
   a plurality of optical fibers each including a first end and a second end, wherein the first end of each optical fiber is coupled to a respective light source and the second end of each optical fiber is coupled to an indicator mount, wherein the indicator mount is coupled to the primary housing and configured to allow light from each light source of the plurality of light sources to be emitted, via a respective optical fiber, outside the primary housing to provide an indication of the status of the power tool, of the battery pack coupled to the power tool, or of both the power tool and the battery pack.

2. The power tool of claim 1, wherein the plurality of light sources emit the light into the first ends of the optical fibers in a first direction that is different from a second direction in which the light is emitted into the indicator mount and outside of the primary housing by the second ends of the optical fibers.

3. The power tool of claim 1, further comprising a potting dam connector mounted to the circuit board to surround the plurality of light sources, wherein the potting dam connector is configured to prevent a potting compound from covering the plurality of light sources, wherein the potting compound is used for potting the circuit board;
   wherein the potting dam connector is configured to receive a second connector, wherein the first ends of the optical fibers are coupled to the plurality of light sources using the second connector and by securing the second connector to the potting dam connector;
   wherein light is provided from each light source to its respective optical fiber through the second connector, and wherein the second connector prevents light from being provided from each light source to other optical fibers besides its respective optical fiber.

4. The power tool of claim 3, wherein the second connector includes a tab configured to secure the second connector to the potting dam connector in response to the second connector being coupled to the potting dam connector.

5. The power tool of claim 1, wherein the indicator mount is made of an opaque material and includes a plurality of holes that are each aligned with a respective first opening of the indicator mount that aligns with a respective second opening of the primary housing; and
   wherein each hole of the plurality of holes receives a respective optical fiber to emit the light from the respective optical fiber through the respective first opening and the respective second opening to an outside of the primary housing.

6. The power tool of claim 5, wherein the respective first opening, the respective second opening, or both the respective first opening and the respective second opening include a conical opening that is wider at a first location away from the respective optical fiber along a main light emission axis than at a second location closer to the respective optical fiber along the main light emission axis.

7. A power tool comprising:
   a primary housing;
   a motor situated within the primary housing;
   a transmission device configured to transmit rotational energy from the motor to an output device of the power tool;
   a circuit board located within the primary housing;
   a light source mounted to the circuit board;
   a light diffuser through which light generated by the light source passes in order to illuminate a work area of the power tool; and
   an optical fiber including a first end and a second end, wherein the first end is coupled to the light source and the second end is coupled to the light diffuser, and wherein the optical fiber is configured to receive the light from the light source and provide the light to illuminate the work area through the light diffuser.

8. The power tool of claim 7, wherein the light diffuser includes a light diffuser ring that surrounds an output axis of the power tool.

9. The power tool of claim 8, further comprising a secondary housing configured to house the transmission device, wherein the light diffuser is integrally molded within a cover configured to cover at least a portion of a front surface of the secondary housing.

10. The power tool of claim 9, wherein an outer portion of the cover is configured to block light from being emitted from at least a portion of the light diffuser ring.

11. The power tool of claim 7, wherein the light diffuser includes a frosted surface, a lensing geometry, or both the frosted surface and the lensing geometry to create approximately uniform light distribution from the light diffuser.

12. The power tool of claim 11, wherein the frosted surface includes a coating on a surface of the light diffuser, a texturing on the surface of the light diffuser, or both the coating and the texturing on the surface of the light diffuser.

13. The power tool of claim 7, further comprising a potting dam connector mounted to the circuit board to surround the light source, wherein the potting dam connector is configured to prevent a potting compound from covering the light source, wherein the potting compound is used for potting the circuit board;
   wherein the potting dam connector is configured to receive a second connector, wherein the first end of the optical fiber is coupled to the light source using the second connector and by securing the second connector to the potting dam connector;
   wherein the light is provided from the light source to the optical fiber through the second connector.

14. A power tool comprising:
   a primary housing;
   a motor situated within the primary housing;
   a circuit board located within the primary housing;
   a light source mounted to the circuit board;
   an optical fiber including a first end and a second end, wherein the first end is coupled to the light source and is configured to receive light generated by the light source, and
      wherein the second end is configured to emit the light to an outside of the primary housing;
   a first connector; and
   a second connector;
   wherein the first connector is mounted to the circuit board to surround the light source;

wherein the first connector is configured to receive the second connector, wherein the first end of the optical fiber is coupled to the light source using the second connector and by securing the second connector to the first connector; and wherein the light is provided from the light source to the optical fiber through the second connector.

15. The power tool of claim 14, further comprising a light diffuser, wherein the second end of the optical fiber is coupled to the light diffuser, and wherein the light generated by the light source passes through the light diffuser to illuminate a work area of the power tool.

16. The power tool of claim 14, wherein the light generated by the light source is emitted to the outside of the primary housing to provide an indication of a status of the power tool, a status of a battery pack coupled to the power tool, or the status of both the power tool and the battery pack.

17. The power tool of claim 16, further comprising an indicator mount, wherein the second end of the optical fiber is coupled to the indicator mount, and wherein the indicator mount is coupled to the primary housing and configured to allow the light from the light source to be emitted to the outside of the primary housing.

18. The power tool of claim 14, further comprising one or more additional optical fibers and one or more additional light sources, wherein each optical fiber is configured to receive light from a respective light source and emit the light to the outside of the primary housing.

19. The power tool of claim 14, wherein the light source emits the light into the first end of the optical fiber in a first direction that is different from a second direction in which the light is emitted to the outside of the power tool by the second end of the optical fiber.

20. The power tool of claim 14, wherein the first connector is configured to prevent a potting compound from covering the light source, wherein the potting compound is used for potting the circuit board.

* * * * *